United States Patent
Lee et al.

(10) Patent No.: US 11,819,734 B2
(45) Date of Patent: Nov. 21, 2023

(54) VIDEO-BASED MOTION COUNTING AND ANALYSIS SYSTEMS AND METHODS FOR VIRTUAL FITNESS APPLICATION

(71) Applicant: NEX Team Inc., San Jose, CA (US)

(72) Inventors: Keng Fai Lee, Cupertino, CA (US); Qi Zhang, Tseung Kwan (HK); Man Hon Chan, Kowloon (HK); On Loy Sung, Lai Chi Kok (HK); Jorge Fino, San Jose, CA (US)

(73) Assignee: NEX Team Inc., San Jose, CA (US)

( * ) Notice: Subject to any disclaimer, the term of this patent is extended or adjusted under 35 U.S.C. 154(b) by 0 days.

(21) Appl. No.: 17/518,850

(22) Filed: Nov. 4, 2021

(65) Prior Publication Data
US 2022/0203165 A1    Jun. 30, 2022

Related U.S. Application Data

(60) Provisional application No. 63/131,334, filed on Dec. 29, 2020.

(51) Int. Cl.
   *A63B 24/00*    (2006.01)
   *A63B 71/06*    (2006.01)
   (Continued)

(52) U.S. Cl.
   CPC ...... *A63B 24/0006* (2013.01); *A63B 24/0021* (2013.01); *A63B 24/0062* (2013.01);
   (Continued)

(58) Field of Classification Search
   CPC ............ A63B 24/0006; A63B 24/0021; A63B 24/0062; A63B 71/0616; A63B 71/0622;
   (Continued)

(56) References Cited

U.S. PATENT DOCUMENTS 8,435,177 B2 *   5/2013   Lanfermann ...... A63B 24/0006
                                                    482/148
8,568,330 B2 *  10/2013   Mollicone ............. A61B 5/024
                                                    600/508
(Continued)

FOREIGN PATENT DOCUMENTS

CN   111931733 B    2/2021
WO   2019175425 A1  9/2019

OTHER PUBLICATIONS

Bazarevsky et al., "BlazePose: On-device Real-time Body Pose tracking", Computer Vision and Pattern Recognition (cs.CV), Jun. 17, 2020, pp. 1-4.

(Continued)

*Primary Examiner* — Malina D. Blaise
(74) *Attorney, Agent, or Firm* — American Patent Agency PC; Daniar Hussain; Stephen M. Hou

(57) ABSTRACT

A system and method for implementing a virtual fitness application are disclosed. Embodiments may be built for various platforms, including web browsers and mobile phones. One embodiment uses pose estimation to count the repetitive motions of a fitness activity (e.g., running). In one embodiment, to count the repetitive motions, a repetitive motion counting process is used that is based on computing differences of Y-coordinates of key points of the user. The repetitive motion counting process includes selecting a proper pose of the user; computing one or more delta values (corresponding to Y-coordinate changes of the key points); and counting a given user movement as a repetitive motion based on a function (e.g., average) of the delta values. One embodiment uses the pose estimation and repetitive motion count results to provide a gamified experience, for example, a leaderboard, a stats report, instant visual feedback, badges, coins, and a social experience.

16 Claims, 17 Drawing Sheets

(51) Int. Cl.
*G06T 7/20* (2017.01)
*G06T 7/70* (2017.01)
*G06N 3/08* (2023.01)
*G06V 20/40* (2022.01)
*G06V 40/10* (2022.01)
*G06V 40/20* (2022.01)

(52) U.S. Cl.
CPC ...... *A63B 71/0616* (2013.01); *A63B 71/0622* (2013.01); *G06N 3/08* (2013.01); *G06T 7/20* (2013.01); *G06T 7/70* (2017.01); *G06V 20/46* (2022.01); *G06V 40/10* (2022.01); *G06V 40/23* (2022.01); *A63B 2024/0009* (2013.01); *A63B 2024/0056* (2013.01); *A63B 2024/0065* (2013.01); *A63B 2071/0677* (2013.01); *G06T 2207/20081* (2013.01); *G06T 2207/20084* (2013.01); *G06T 2207/30196* (2013.01); *G06T 2207/30221* (2013.01)

(58) Field of Classification Search
CPC .. G06T 7/70; G06T 7/20; G06V 20/46; G06V 40/10; G06V 40/23; G06N 3/08
See application file for complete search history.

(56) References Cited

U.S. PATENT DOCUMENTS

| | | | | |
|---|---|---|---|---|
| 9,462,230 | B1 * | 10/2016 | Agrawal | G06Q 50/20 |
| 11,024,053 | B1 * | 6/2021 | Zhang | G06T 5/20 |
| 2011/0251495 | A1 * | 10/2011 | Province | A61B 5/01 |
| | | | | 600/587 |
| 2012/0052972 | A1 * | 3/2012 | Bentley | A63B 60/46 |
| | | | | 473/223 |
| 2012/0130515 | A1 * | 5/2012 | Homsi | G09B 19/0038 |
| | | | | 700/91 |
| 2012/0143358 | A1 * | 6/2012 | Adams | G06F 3/0482 |
| | | | | 700/92 |
| 2012/0190505 | A1 * | 7/2012 | Shavit | A63B 24/0062 |
| | | | | 482/8 |
| 2012/0253484 | A1 * | 10/2012 | Burich | G16H 40/67 |
| | | | | 700/91 |
| 2014/0232650 | A1 * | 8/2014 | Kennett | G06V 40/20 |
| | | | | 345/158 |
| 2016/0042529 | A1 * | 2/2016 | Tao | G06T 7/20 |
| | | | | 382/107 |
| 2017/0004358 | A1 * | 1/2017 | Bose | G06Q 10/0639 |
| 2021/0001172 | A1 * | 1/2021 | Namboodiri | G16H 20/30 |
| 2022/0051061 | A1 * | 2/2022 | Chi | G06V 10/764 |
| 2022/0203165 | A1 * | 6/2022 | Lee | G06V 10/82 |

OTHER PUBLICATIONS

Takeichi et al., "A Mobile Application for Running Form Analysis Based on Pose Estimation Technique", IEEE, Nov. 29, 2018, pp. 1-4.

Fitnet, "Personal Trainer for Everyone", Fitnet-Video Fitness Trainer. Accessed Sep. 2021. Available at: http://fit.net/.

Krishna Raj R., "Human Pose Comparison and Action Scoring using Deep Learning, OpenCV & Python", Analytics Vidhya Medium, Apr. 13, 2020, pp. 1-12.

Tempo, "AI-Powered Home Gym With Personalized Guidance for Every Workout", The Award-Winning AI-Powered Home Gym. Accessed Sep. 2021. Available at: https://tempo.fit/.

Mirror, "The Nearly Invisible Home Gym", The holy grail of home gyms. Accessed Sep. 2021. Available at: https://www.mirror.co/.

* cited by examiner

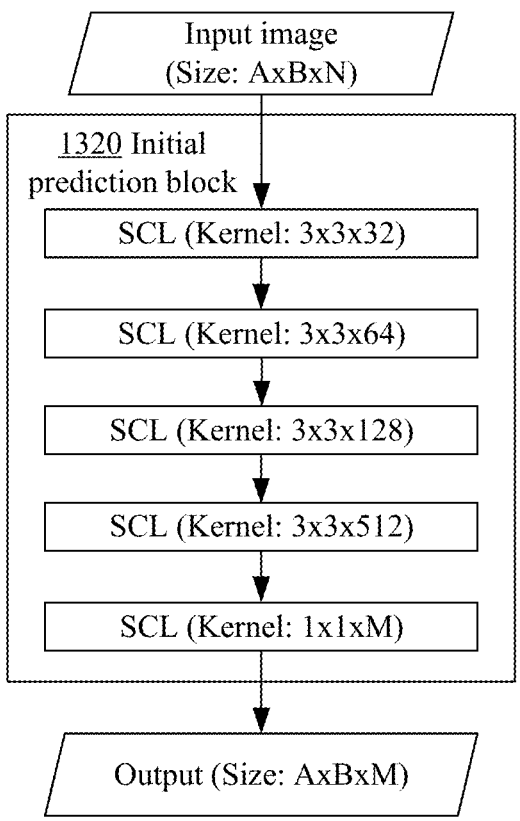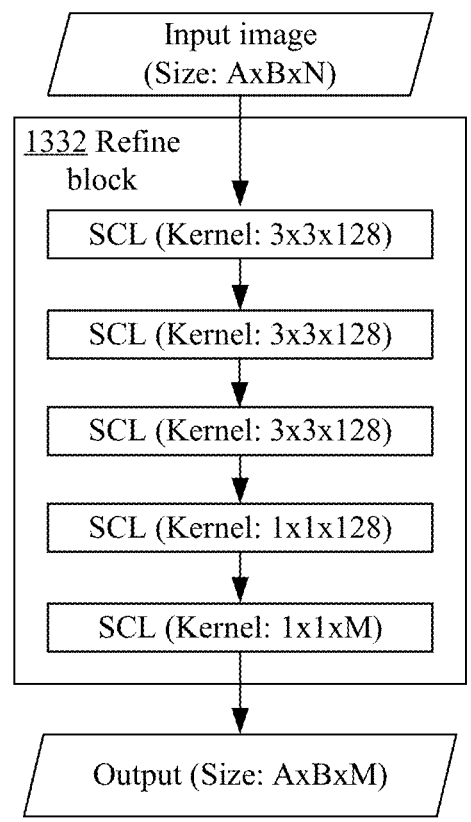
*FIG. 13D*  *FIG. 13E*

VIDEO-BASED MOTION COUNTING AND ANALYSIS SYSTEMS AND METHODS FOR VIRTUAL FITNESS APPLICATION

REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

This application is also related to U.S. Ser. No. 17/503,295, filed on 16 Oct. 2021, entitled "REPETITION COUNTING AND CLASSIFICATION OF MOVEMENTS SYSTEMS AND METHODS".

This application is further related to U.S. Pat. No. 10,489,656 issued from U.S. Ser. No. 16/109,923, filed on 23 Aug. 2018, entitled "Methods and Systems for Ball Game Analytics with a Mobile Device", and to U.S. Ser. No. 16/424,287, filed on 28 May 2019, entitled "Methods and Systems for Generating Sports Analytics with a Mobile Device".

This application is further related to U.S. Pat. No. 10,643,492 issued from U.S. Ser. No. 16/445,893, filed on 19 Jun. 2019, entitled "REMOTE MULTIPLAYER INTERACTIVE PHYSICAL GAMING WITH MOBILE COMPUTING DEVICES", and to U.S. Pat. No. 10,930,172 issued from U.S. Ser. No. 16/792,190, filed on 15 Feb. 2020, entitled "METHODS AND SYSTEMS FOR FACILITATING INTERACTIVE TRAINING OF BODY-EYE COORDINATION AND REACTION TIME".

The entire disclosures of all referenced applications are hereby incorporated by reference in their entireties herein.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

The present invention is related to a virtual fitness application. In particular, the present invention is related to methods and systems for counting repetitive motions in a video captured using a camera device.

BACKGROUND OF THE INVENTION

The background of the invention section is provided merely to help understand the context of the invention and its application and uses, and may not be considered prior art.

Advances in modern computing technology have enabled active video games, exergames, or interactive fitness games that combine physical activities with video games to promote fitness and healthy living. Some gyms, health clubs, recreational centers, and schools incorporate exergames into their facilities using specialized equipment. For example, interactive wall-climbing games, active floor and wall games, and dance and step games have become popular in recent years, but each require pre-installed sensing and display devices, such as interactive walls and floors with embedded sensors, and large projector screens. For home gaming systems, dedicated gaming consoles, handheld remote controllers, motion sensing controllers, and other accessories, such as arm straps, headsets, balance boards, and dance mats are often needed.

Real-time tracking technology based on image recognition often requires the use of multiple high-definition cameras used for capturing visual data from multiple camera arrays positioned at multiple perspectives, calibration for different environments, and massive processing power in specialized desktop and/or server-grade hardware to analyze the data from the camera arrays. Mobile, computer, and TV console games have proliferated over the past decade, with lessened dependence on specialized, stationary hardware, and some games can incorporate physical locations to encourage physical movements of the player in an augmented reality setting, but such games are still played mostly on-screen. Currently, no existing fitness or gaming applications can facilitate exercises, physical games, or activities, for example, ones that involve running and the like, using general-purpose computing devices.

Therefore, it would be an advancement in the state of the art to provide a virtual fitness application, which provides both exercise tracking and entertainment, from a general-purpose computing device having access to a generic camera device.

It is against this background that various embodiments of the present invention were developed.

SUMMARY OF THE INVENTION

A system and method for implementing a virtual fitness application are disclosed. Embodiments may be built for various platforms, including web browsers and apps on general-purpose computing devices, TV consoles, smart TVs, and mobile phones. One embodiment of the present invention is based on using pose estimation to count the repetitive motions of a fitness activity (e.g., jogging in place). The exemplary embodiment uses the pose estimation and counting results to provide a gamified experience, for example, a leaderboard, a stats report, instant visual feedback (sound effects, animations, etc.), badges, coins, collectables, a battle mode, a tournament mode, and a social experience.

Accordingly, one embodiment of the present invention is a computer-implemented method executable by a processor for implementing a virtual fitness application. The method includes the steps of receiving an input video of a user from a camera; detecting a sequence of human poses in the input video using a pose estimation process; counting one or more repetitive motions of a fitness activity within the sequence of human poses; and computing a plurality of statistics about the fitness activity.

In one embodiment, the fitness activity may be running, jogging, walking, jumping, performing jumping jacks, squatting, and/or dribbling, and the like. For example, running-in-place, jogging-in-place, walking-in-place, jumping-in-place, performing jumping-jacks-in-place, squatting-in-place, and/or dribbling-in-place, and the like. In one embodiment, the repetitive motions may be steps, jumps, squats, and/or dribbles, and the like.

In one embodiment, counting the repetitive motions of the fitness activity is based on computing differences of Y-coordinates of one or more key points in the sequence of human poses. In one embodiment, counting the repetitive motions includes first selecting a proper pose as the user of the fitness activity (for one or more frames in the input video). Next, computing one or more delta values ($y_t-y_{t-1}$), corresponding to Y-coordinate changes over time, of one or more key points of the proper pose. Then, computing a function (e.g., an average) of the delta values for the key points of the proper pose. Finally, counting a given user movement as a repetitive motion based on the function of the delta values. (In this context, Y-coordinates may be considered positive in the direction away from the ground plane, but any reasonable coordinate system is within the scope of the present invention.)

In one embodiment, the selecting the proper pose includes selecting a most centered pose as the proper pose, when the processor has detected multiple poses (e.g., from multiple people) in a given frame. In one embodiment, the selecting the proper pose includes selecting the proper pose utilizing a human tracking algorithm, when the processor has detected multiple poses in a given frame.

In one embodiment, the key points include one or more body joints of the user. In one embodiment, the key points are a nose, an eyes, an ears, a chest, and/or a shoulders of the user.

In one embodiment, the function of the delta values is a mean (average), a median, and/or a single delta value selection (e.g., the most recent delta value, with extremes removed). The function of the delta values may be any reasonable function that generates an output value from the set of delta values, the output value assisting with determining which delta values correspond to repetitive motions (and which are noise, etc.).

In one embodiment, the function of the delta value is a mean (average) value of the delta values. The method may then include counting a given user movement as a repetitive motion when the mean delta value changes from positive, to negative, and then changes back to positive. (In this context, Y-coordinates are considered positive in the direction away from the ground plane.)

In one embodiment, the method further includes applying a smoothing function on the Y-coordinates of the key points before computing the delta values.

In one embodiment, the method further includes performing a checking process on the given user movement's metrics to invalidate the given user movement based on one or more criteria (e.g., those that are not reasonable). In one embodiment, the checking process excludes the given user movement when its rising period is more than a given threshold (e.g., a step is always less than 1 second). In one embodiment, the checking process excludes the given user movement when its rising amplitude is smaller than a given threshold (e.g., a step requires at least 1 inch). In one embodiment, the method adjusts the checking process dynamically based on a detection sensitivity parameter. In one embodiment, the method utilizes a limb movement (e.g., a hand swing and/or a leg movement) to control the checking process.

In one embodiment, the method further includes presenting one or more gamification elements based on the plurality of statistics. In one embodiment, the gamification elements include a leaderboard, a coin, and/or a badge.

In one embodiment, the input video may be captured using a mobile device camera or other portable camera device.

In one embodiment, the pose estimation process is based on a Convolutional Neural Network (CNN).

Another embodiment of the present invention is a non-transitory storage medium for implementing a virtual fitness application. The non-transitory storage medium stores program code, which when executed by a hardware processor, causes the processor to implement the virtual fitness application. The program code, when executed by the processor, causes the processor to receive an input video of a user from a camera; detect a sequence of human poses in the input video using a pose estimation process; count one or more repetitive motions of a fitness activity within the sequence of human poses; and compute a plurality of statistics about the fitness activity.

In one embodiment, the program code to count the repetitive motions of the fitness activity is based on program code to compute differences of Y-coordinates of one or more key points in the sequence of human poses. In one embodiment, the program code to count the repetitive motions includes program code to first select a proper pose as the user of the fitness activity (for one or more frames in the input video). Further includes program code to compute one or more delta values ($y_t-y_{t-1}$), corresponding to Y-coordinate changes over time, of one or more key points of the proper pose. Further includes program code to compute a function (e.g., an average) of the delta values for the key points of the proper pose. Finally, includes program code to count a given user movement as a repetitive motion based on the function of the delta values.

In one embodiment, the program code to select the proper pose includes program code to select a most centered pose as the proper pose, when the processor has detected multiple poses (e.g., from multiple people) in a given frame. In one embodiment, the program code to select the proper pose includes program code to select the proper pose utilizing a human tracking algorithm, when the processor has detected multiple poses in a given frame.

In one embodiment, the key points include one or more body joints of the user. In one embodiment, the key points are a nose, an eyes, an ears, a chest, and/or a shoulders of the user.

In one embodiment, the function of the delta values is a mean (average), a median, and/or a single delta value selection (e.g., the most recent delta value, with extremes removed). In one embodiment, the program code counts a given user movement as a repetitive motion when the mean delta value changes from positive, to negative, and then changes back to positive.

In one embodiment, the program code applies a smoothing function on the Y-coordinates of the key points before computing the delta values.

In one embodiment, the program code checks a given motion's metrics to invalidate the given motion based one or more criteria. In one embodiment, the program code excludes the given motion when its rising period is more than a given threshold. In one embodiment, the program code excludes the given motion when its rising amplitude is smaller than a given threshold. In one embodiment, the program code adjusts the checking of the given motion's metrics dynamically based on a detection sensitivity parameter. In one embodiment, the program code utilizes a limb movement to control the checking.

In one embodiment, the program code presents one or more gamification elements based on the plurality of statistics. In one embodiment, the gamification elements include a leaderboard, a coin, and/or a badge.

In one embodiment, the input video may be captured using a mobile device camera or other portable camera device.

In one embodiment, the pose estimation process is based on a Convolutional Neural Network (CNN).

Yet another embodiment of the present invention is a system for implementing a virtual fitness application. The system includes an image-capturing device, configured to capture an input video (e.g., a plurality of images) of a user. The system also includes a non-transitory storage medium storing program code, which when executed by a processor, causes the processor to implement the virtual fitness application. The program code, when executed by the processor, causes the processor to receive the input video of the user from the image-capturing device; detect a sequence of human poses in the input video using a pose estimation process; count one or more repetitive motions of a fitness activity within the sequence of human poses; and compute a plurality of statistics about the fitness activity.

Yet other embodiments of the present invention include the methods and modes of operation of the systems, servers, and devices described herein. Other embodiments of the present invention will become apparent from the detailed description below and the drawings corresponding thereto.

BRIEF DESCRIPTION OF THE DRAWINGS

Embodiments of the present invention described herein are exemplary, and not restrictive. Embodiments will now be described, by way of examples, with reference to the accompanying drawings. In these drawings, each identical or nearly identical component that is illustrated in various figures is represented by a reference number. For purposes of clarity, not every component is labeled in every drawing. The drawings are not necessarily drawn to scale, with emphasis instead being placed on illustrating various aspects of the techniques and devices described herein.

The foregoing and other objects, aspects, and advantages are better understood from the following detailed description of a preferred embodiment of the invention with reference to the drawings, in which:

FIG. 13D is a detailed block diagram illustrating an exemplary Initial Prediction Block of FIG. 13A, according to exemplary embodiments of the present invention.

FIG. 13E is a detailed block diagram illustrating an exemplary Refine Block of FIG. 13A, according to exemplary embodiments of the present invention.

DETAILED DESCRIPTION OF THE INVENTION

Overview

Figure 1:
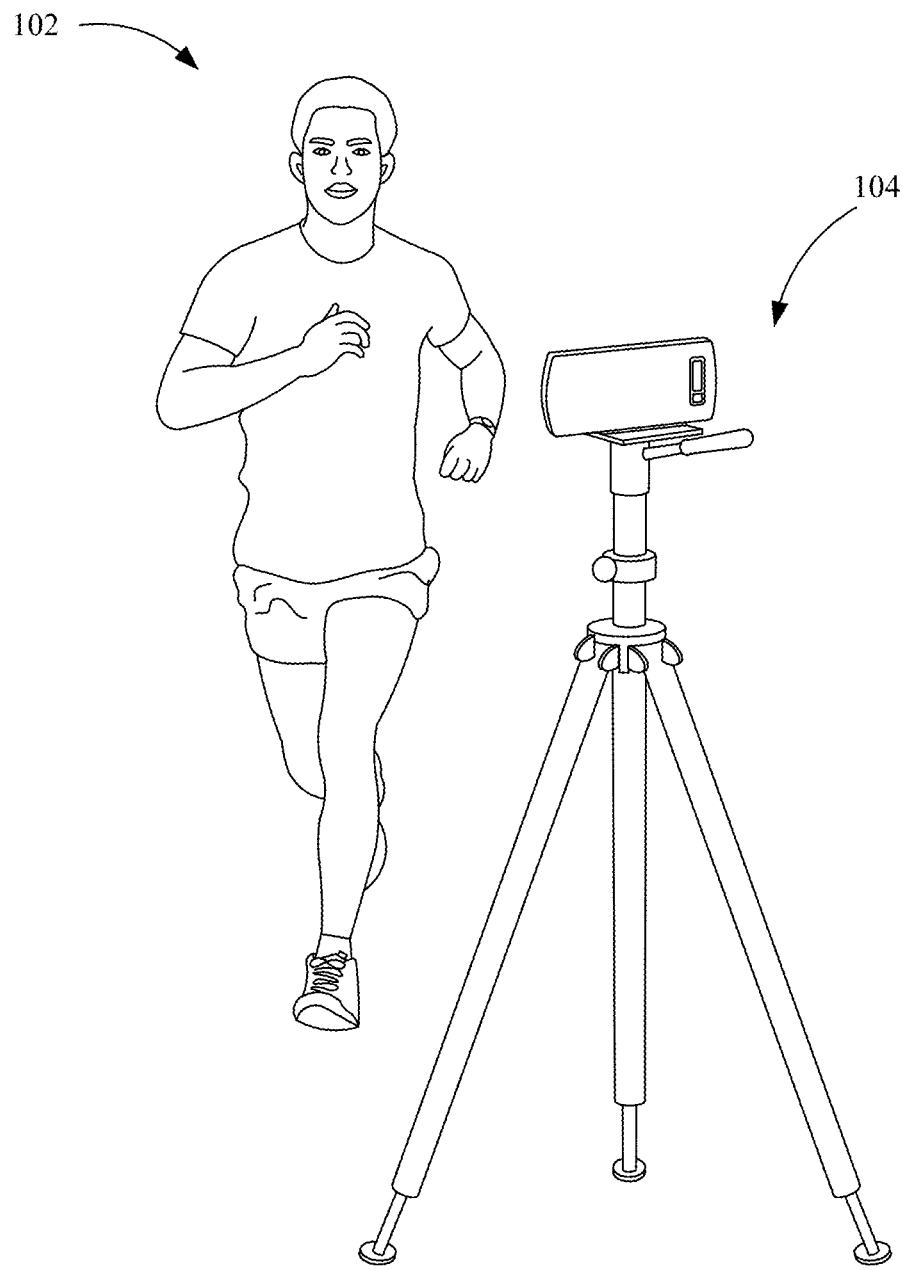
FIG. 1 shows an illustrative architectural setup of the present invention, showing a user engaged in a fitness activity in front of a computing device, in accordance with an exemplary embodiment of the present invention.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

NEX, NEX TEAM, and HOMECOURT are trademark names carrying embodiments of the present invention, and hence, the aforementioned trademark names may be interchangeably used in the specification and drawing to refer to the products/services offered by embodiments of the present invention. The term NEX, NEX TEAM, or HOMECOURT may be used in this specification to describe the overall game video capturing and analytics generation platform, as well as the company providing said platform.

With reference to the figures provided, embodiments of the present invention are now described in detail.

INTRODUCTION

Broadly, embodiments of the present invention relate to a system and method for implementing a virtual fitness application. Embodiments may be built for various platforms, including web browsers and apps on general-purpose computing devices, TV consoles, smart TVs, and mobile phones. One embodiment of the present invention is based on pose estimation to count the repetitive motions of a fitness activity (e.g., jogging in place). The exemplary embodiment uses the pose estimation and repetitive motion count results to provide a gamified experience, for example, a leaderboard, a stats report, instant visual feedback (sound effects, animations, etc.), badges, coins, collectables, a battle mode, a tournament mode, and a social experience.

Embodiments of the present invention relate to real-time analysis of repetitive motions (for example, motions that occur as part of a fitness/training use case and/or a game or game play) using general-purpose computing devices, such as smartphones, tablets, TV consoles, and the like. It would be understood by persons of ordinary skill in the art that the terms "fitness" and "training" in this disclosure can refer to individual or group-based movements associated with exercise, dance, and/or the like. Further, "game" and "game play" in this disclosure refer to not only competitive activities involving opposing teams, but also individual and group practice or drilling activities, which can include repetitive motions. In other words, embodiments of the present invention may be used for capturing and analyzing activities and associated repetitive motions, as long as there is at least one user present and being recorded.

More specifically, some embodiments of the present invention relate to determining repetitive motions and counting those repetitive motions within a media file, such as in a video. In some embodiments, the method can be implemented in real-time. In another aspect, the disclosed systems can implement the method in an incremental fashion on subsequent frames of the video. In some aspects, at least a portion of the operations below can be repeated for each video frame. The method can include, but not be limited to, the operations of receiving an input video of a user from a camera; detecting a sequence of human poses in the input video using a pose estimation process; counting one or more repetitive motions of a fitness activity within the sequence of human poses; and computing a plurality of statistics about the fitness activity, as described further below.

The fitness activity may be running, jogging, walking, jumping, performing jumping jacks, squatting, and/or dribbling, and the like. The motions may be steps, jumps, squats, and/or dribbles, and the like. In some embodiments, the repetitive motions may include dance moves, workout moves, gestures, and/or combinations therefore, or any motion with a periodic or quasi-periodic nature (within a predetermined error tolerance).

Some embodiments of the present invention allow the user to experience fitness with other players virtually, compete in virtual fitness competitions, and the like. One of ordinary skill in the art will appreciate that such embodiments can be used in a variety of combinations to allow for the movements multiple players to be tracked and analyzed, whether the players are playing an organized game and/or sport, or performing another activity such as a training session, a dance session, and/or the like.

Unlike some computer vision-based real-time sports analysis systems that may require several cameras (e.g., high-resolution cameras) mounted on top of or sidelines of a training area, and the use of specialized desktop or server hardware, embodiments of the present invention allow users to perform real-time or near real-time analysis of a fitness activity with a general-purpose computing device, such as a smartphone, tablet, laptop, desktop, TV console, smart TV, or even smart glasses. In various embodiments, methods including, but not limited to, computer vision techniques, such as image registration, motion detection, background subtraction, object tracking, 3D reconstruction techniques, cluster analysis techniques, camera calibration techniques (such as camera pose estimation and sensor fusion), and one or more machine learning techniques (such as convolutional neural network (CNN)), can be selectively combined to perform relatively high accuracy analysis in real-time or near-real time on a user device, or on a user device in combination with a second device (e.g., a second user device, a server, an edge server, combinations thereof, and/or the like).

In the case of a mobile device performing the described methods, the limited computational resources in a mobile device may present some challenges. For instance, some examples can include the fact that a smartphone's limited central processing unit (CPU) processing power can be heat-sensitive. CPU clock rate can be reduced by the operating system (OS) whenever the phone heats up. Also, when a system consumes too much memory, it can get terminated by the operating system (OS). The amount of battery use that the analytics system consumes can be a factor to minimize, otherwise the limited battery on a smartphone may not last a predetermined threshold duration (e.g., the duration of a whole game). In various embodiments, the disclosed systems and methods can serve to increase the computational efficiency for running these techniques on a mobile device and can, for example, reduce the amount of power usage by the mobile device, leading to increased battery lifetime.

In some embodiments, a convolutional neural network (CNN) may be applied to some or all frames of the video to detect players, and their respective poses. A tracking algorithm may be performed to track all detected poses, when multiple players may be present in each frame of the video, to generate multiple pose flows. In some embodiments, a flow refers to user instances from different frames. All user instances in the same flow may be considered the same user. In other words, for a pose in a flow, all instances of the pose in all frames of the video are identified as the same user. In various embodiments, object clustering or classification methods such as k-means, affinity propagation, density-based spatial clustering of applications with noise (DBSCAN) and/or k-nearest neighbors (KNN) may be applied to differentiate detected user images into specific users.

When a single user is being recorded, a single pose flow may be detected and associated with the user directly. When multiple users are being recorded, the system may distinguish the players based on visual features such as jersey colors, or distinguishing facial or body features, and each user may register with the system before the start of the session by logging in such visual features. For example, in a single-device, multi-player, training session, the camera on the computing device may capture sufficient training area to allow two users to train together.

In some respects, to detect users of interest from frames of the input video, one or more CNNs may be applied. Each CNN module may be trained using one or more prior input videos. A CNN utilizes the process of convolution to capture the spatial and temporal dependencies in an image, and to extract features from the input video for player detection. Feature extraction in turn enables segmentation or identification of image areas representing these players, and further analysis to determine player body poses. Note that a player moves through space, leading to changing locations, sizes, and body poses.

In computer vision, pose or posture estimation is the task of identifying or detecting the position and orientation of an object in an image, relative to some coordinate system. This is generally formulated as the process of determining key point locations that describe the object. In the case of a ball, pose estimation may refer to determining the center and radius of the ball in the image plane. Hand pose estimation, on the other hand, is the process of determining finger joints and fingertips in a given image, where the whole hand is viewed as one object. Head pose estimation is the process of determining and analyzing facial features to obtain the 3D orientation of the human head with respect to some reference point. Human pose estimation is the process of detecting major parts and joints of the body, such as head, torso, shoulder, ankle, knee, and wrist. In this disclosure, a "player image" refers to the image of a human player segmented from the input video, for example as defined by a bounding box. The terms "pose" and "posture" are used interchangeably to refer to either a player image or a set of key points extracted from the player image to represent the body pose or posture.

In summary, many exercises can include repetitive body and limb movements. The disclosed systems can be configured to count the repetitions of such movements in real-time by analyzing the video frames from a camera (e.g., of a user device). It is understood that the disclosed embodiments should not be limited to the type of motions disclosed, as long as it consists of repetitive motions. For example, the motions may be associated with a sport, an exercise, a rehabilitation process, and/or the like. Further, the motions do not necessarily have to be associated with a person, but can be described for any object that moves in a repetitive manner (such as dribbling a basketball). Further, motion counting results can be provided in real-time or near real-time.

Outline of Figures

Figure 2:
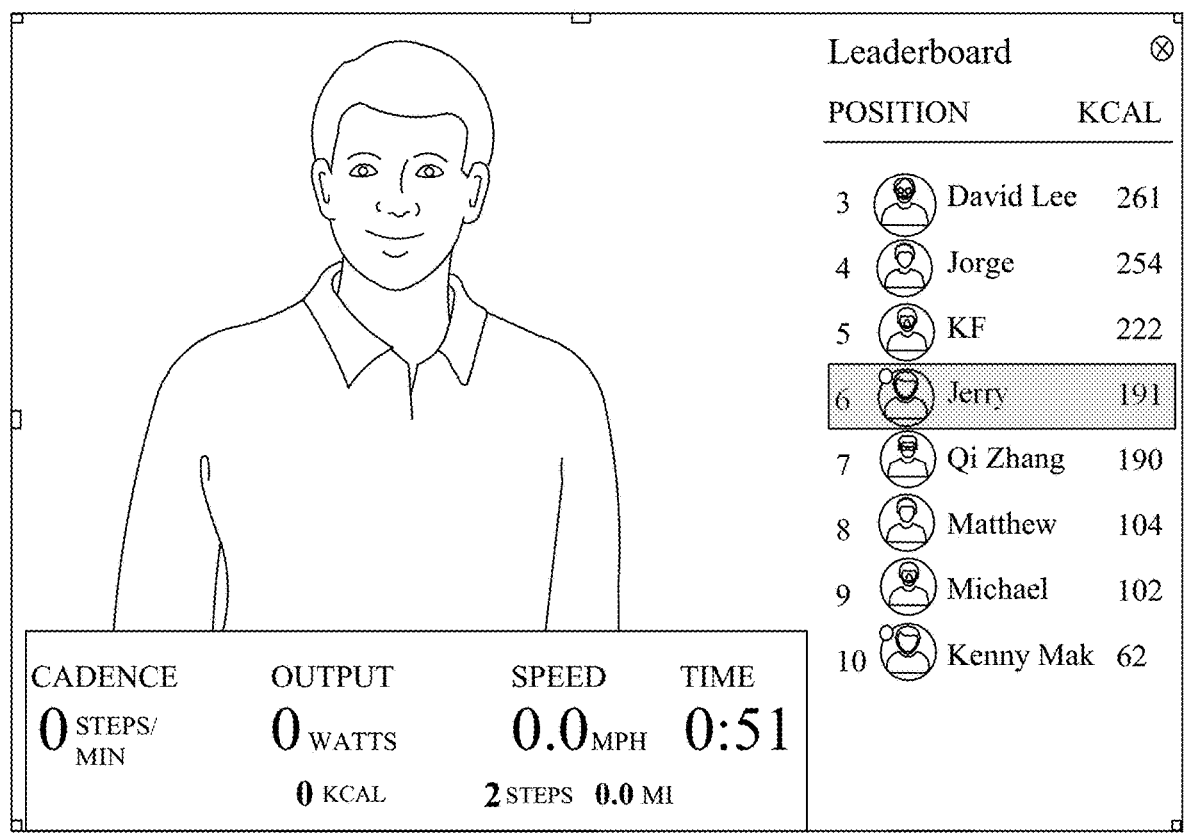
FIG. 2 shows a screenshot of a virtual fitness application before a fitness activity has started, in accordance with an exemplary embodiment of the present invention.
Figure 3:
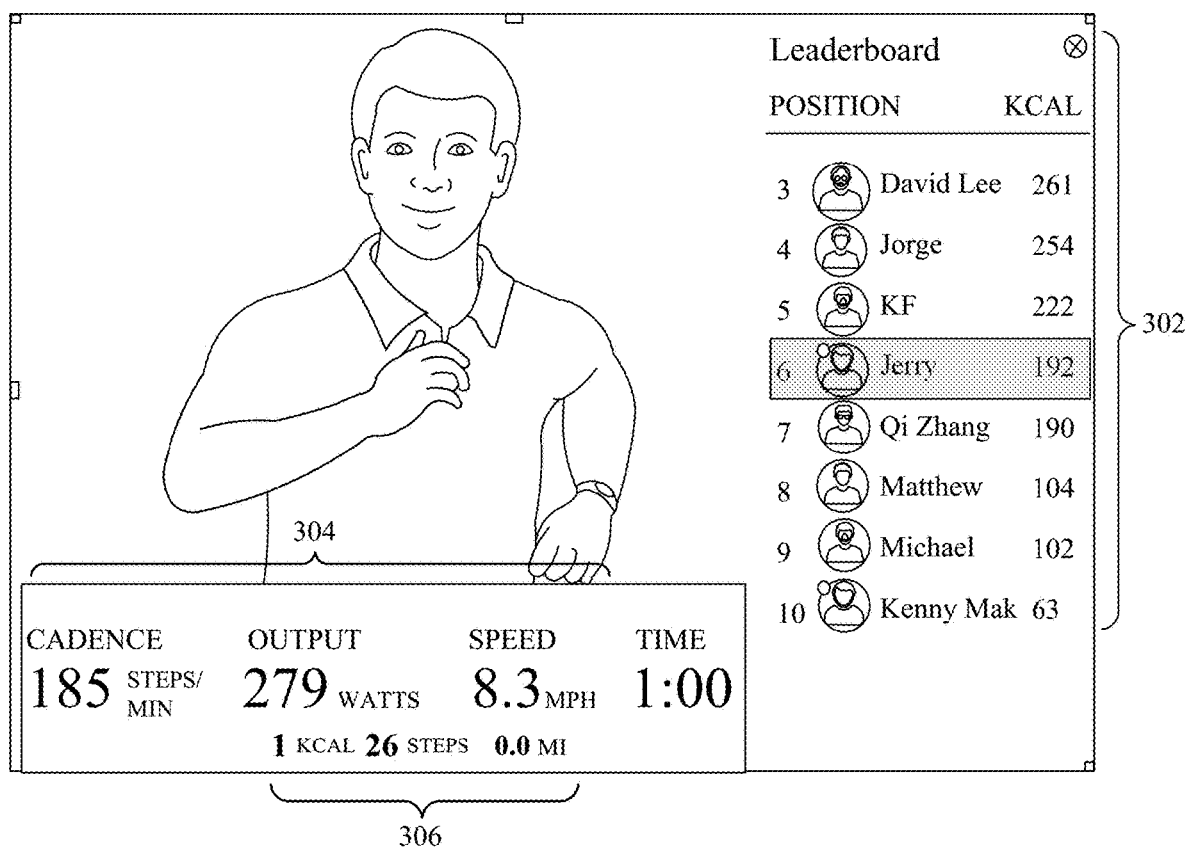
FIG. 3 shows a screenshot of the virtual fitness application with user statistics annotated during a fitness activity, in accordance with an exemplary embodiment of the present invention.
Figure 4:
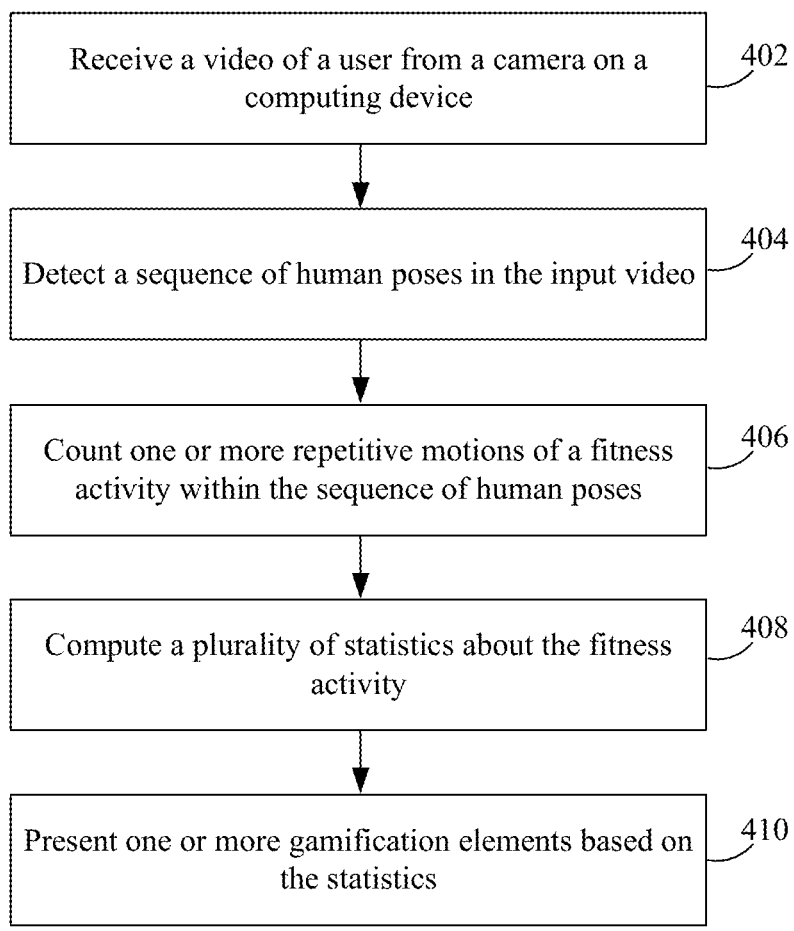
FIG. 4 shows an illustrative method for implementing a virtual fitness application, in accordance with an embodiment of the present invention.
Figure 5:
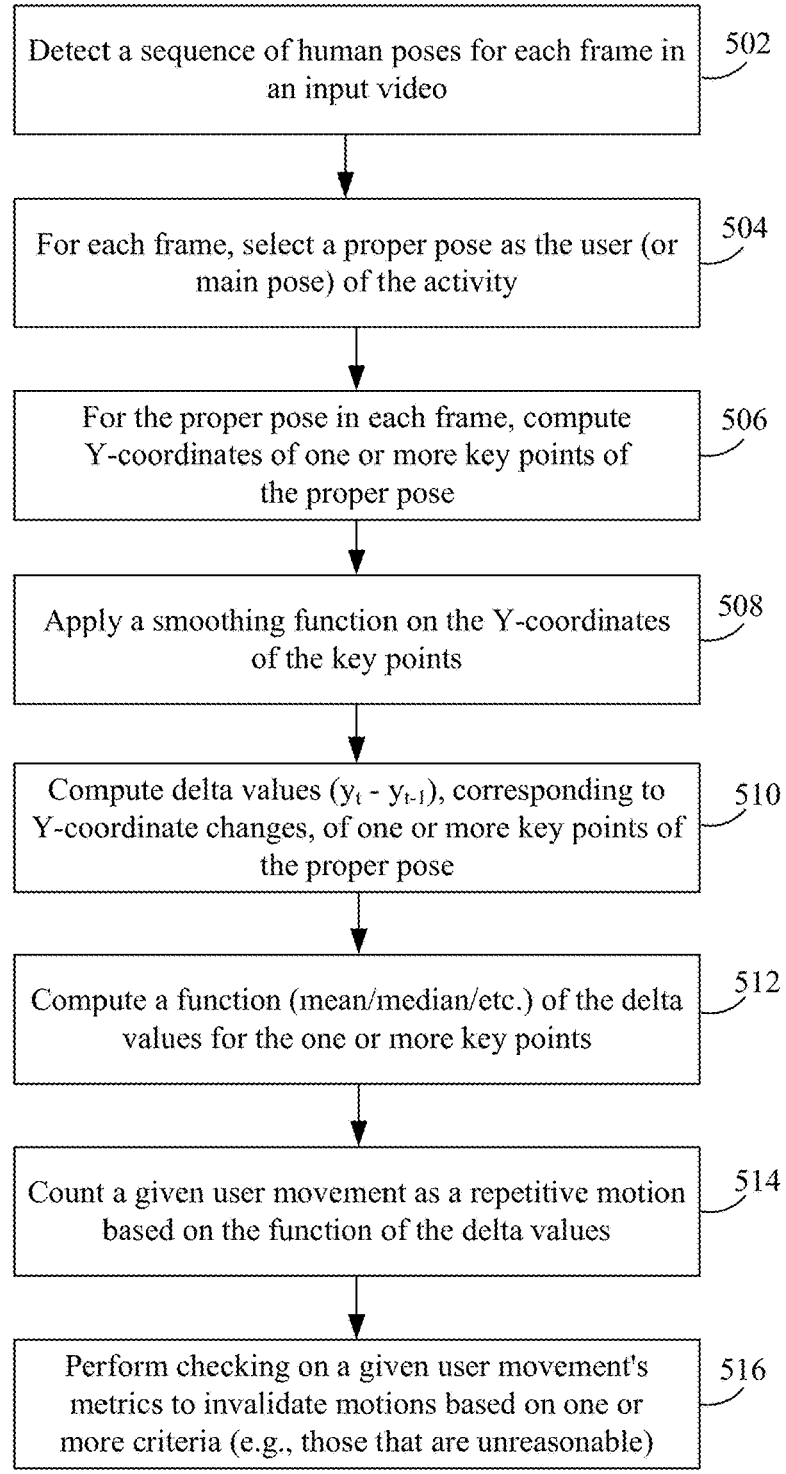
FIG. 5 shows an illustrative method for repetitive motion counting within the virtual fitness application, in accordance with an embodiment of the present invention.
Figure 6:
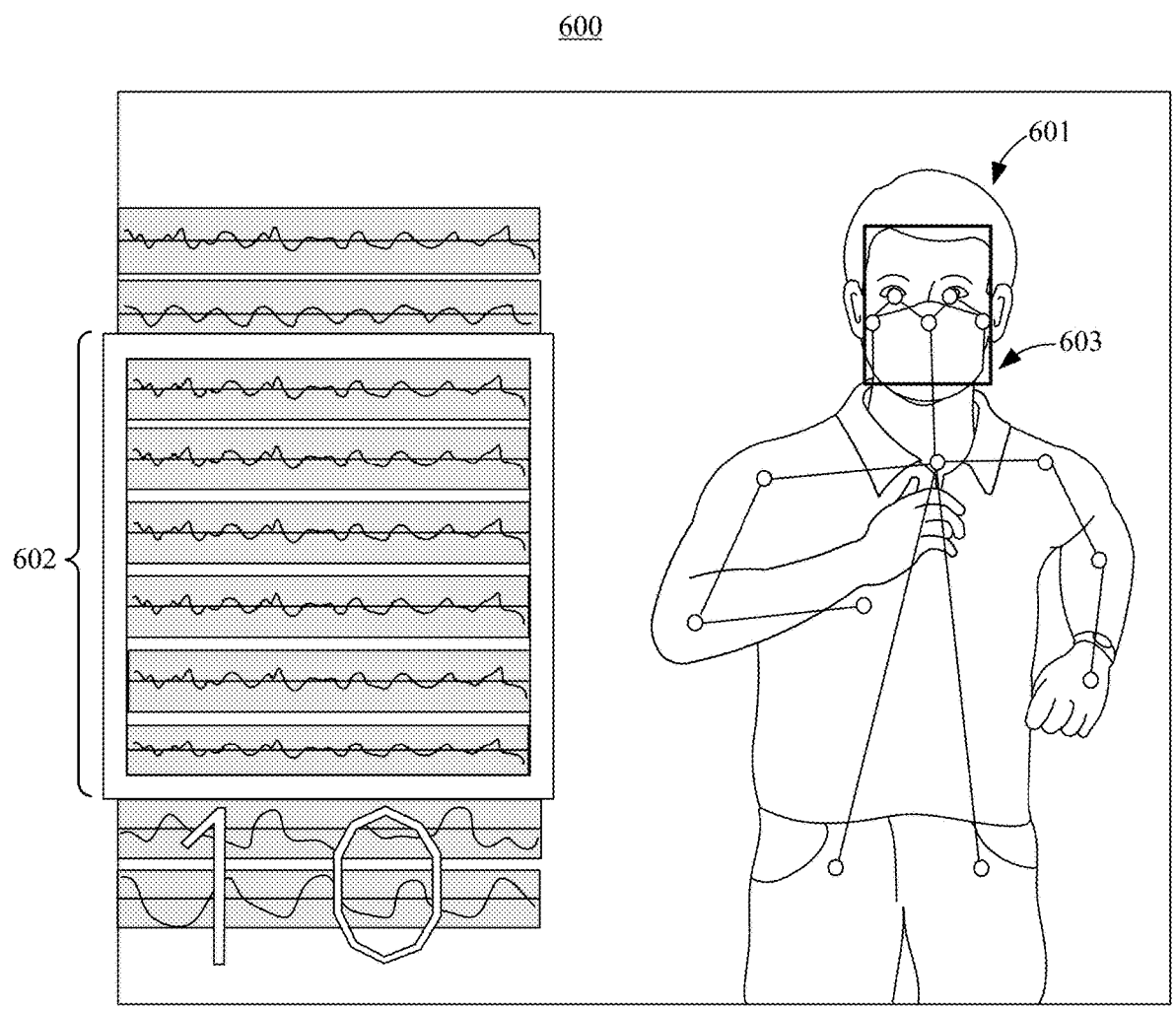
FIG. 6 shows a diagram illustrating the repetitive motion counting method corresponding to FIG. 5, in accordance with an embodiment of the present invention.
Figure 7:
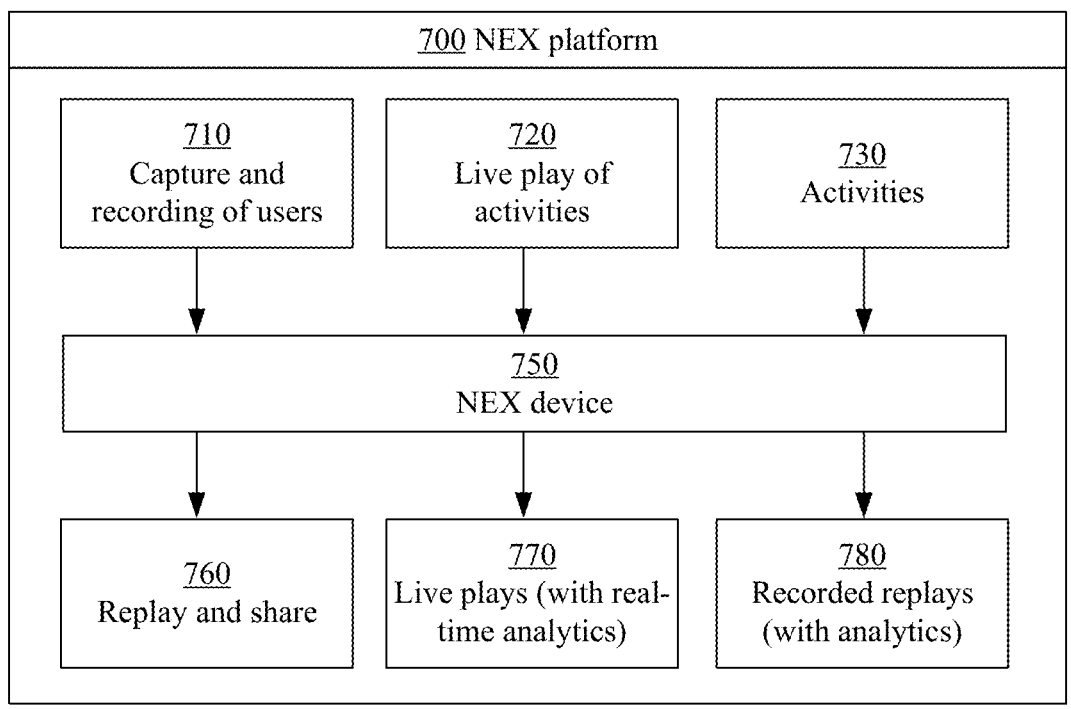
FIG. 7 is a schematic diagram illustrating a NEX platform, according to one embodiment of the present invention.
Figure 8:
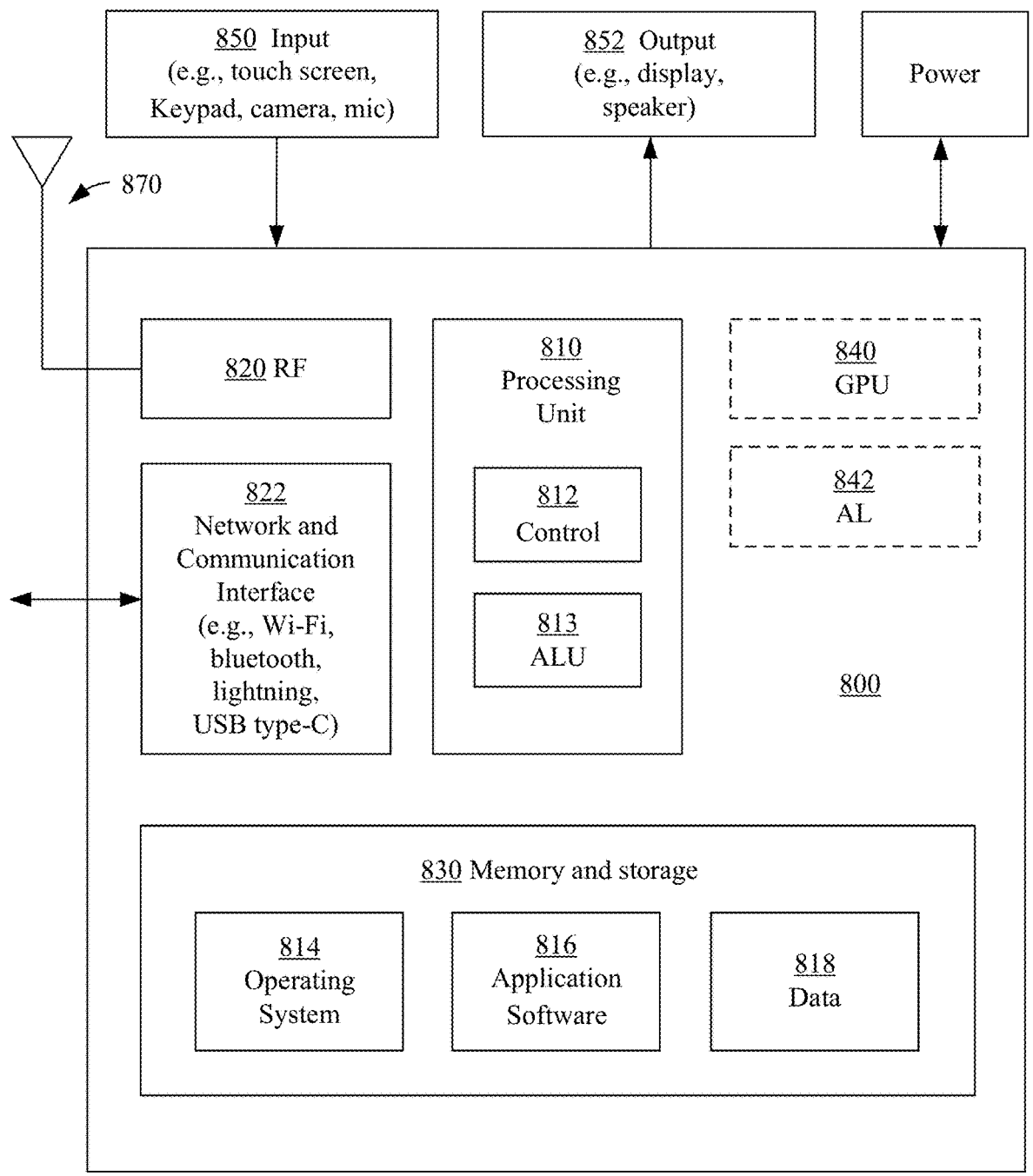
FIG. 8 is an exemplary schematic diagram of a user computing entity for implementing a virtual fitness application, according to exemplary embodiments of the present invention.
Figure 9:
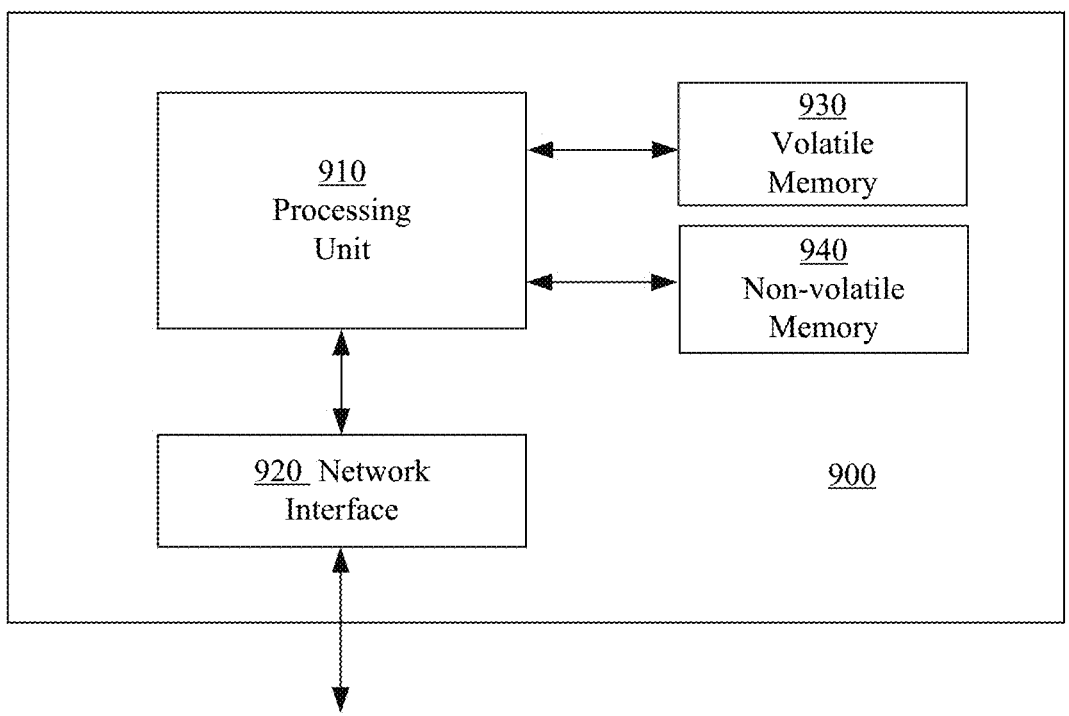
FIG. 9 is an exemplary schematic diagram of a management computing entity for implementing a virtual fitness application, according to exemplary embodiments of the present invention.

Before presenting addition disclosure, a brief summary of the figures is provided for clarity and readability. FIG. 1 shows an illustrative architectural setup of the present invention. FIGS. 2-4 illustrate a virtual fitness application and associated methods. FIGS. 5-6 show an illustrative repetitive motion counting method for use with the virtual fitness application. FIG. 7 is a schematic diagram showing an illustrative full NEX platform within which the present invention may be implemented. FIGS. 8-9 show schematic diagrams of computing devices in which the present invention may be implemented. Finally, FIGS. 10-14 illustrate operations associated with various machine learning components of the disclosed systems which may aid with implementation of the present invention.

Virtual Fitness Application

FIG. 1 shows an illustrative architectural setup 100 of the present invention, showing a user 102 engaged in a fitness activity in front of a computing device 104, in accordance with an exemplary embodiment of the present invention. The user 102 is shown performing a fitness activity, that is, running or jogging in place. The mobile computing device 104 captures one or more videos of the user 102, each video comprising one or more images or frames. The videos of the user 102 are transmitted via a wireless or wired communication channel to a server (not shown). The videos of the user 102 may be processed locally on the mobile computing device 104 or on the server (not shown), in various embodiments of the present invention. The server may also store various statistics, and transmit the recorded data to the mobile computing device 104 for display to the user 102. Some embodiments of the architecture of the mobile computing device 104 and the server are described in greater detail below.

As shown in diagram 100, in one aspect, a user or player 102 can perform a fitness activity (e.g., running-in-place) in front of a mobile computing device 104, which can optionally be secured on a mounting apparatus. The equivalent terms "player" and "user" is used interchangeably in the present disclosure to refer to user 102. The optional mounting apparatus may be a tripod or a kickstand or any similar apparatus providing a stable view of the user 102. In some examples, during a training session, an embodiment of the NEX system implemented on mobile computing device 104 may provide audio or visual instructions, goals, or cues, for user 102 to perform a next movement or set of movements. Such instructions, goals, or cues, can in some examples, be used to improve the performance of one or more machine learning techniques used to classify the user's movement patterns. Mobile computing device 104 may comprise one or more cameras for capturing a video of user 102, for example using a front-facing camera, for computer vision-based, real-time, near real-time, or off-line pose analysis. The captured video may be presented to the user through a display screen on the mobile computing device 104 (or the display screen of a second device, such as a second mobile device), with or without superimposed graphical or textual instructions, cues, analytics, statistics, or other visual training information add-ons. In some embodiments, mobile computing device 104 may be coupled to a larger external display (not shown), through a wireless or wired connection, such that the user may see the captured video and optional training information with better clarity.

The drawings and description primarily focus on the fitness activity being running, jogging, and/or walking for illustrative purposes. However, embodiments of the present invention contemplate that the fitness activity may be running, jogging, walking, jumping, performing jumping jacks, squatting, and/or dribbling, and the like. For example, running-in-place, jogging-in-place, walking-in-place, jumping-in-place, performing jumping-jacks-in-place, squatting-in-place, and/or dribbling-in-place, and the like. The motions may be any repetitive, or quasi-repetitive, motions, including steps, jumps, squats, and/or dribbles, and the like.

Also, the drawings and description primarily focus on the virtual fitness application running on a mobile computing device (for example, a mobile phone 104, that is held by a tripod or some other means as shown in FIG. 1). However, embodiments of the present invention may be implemented on any general-purpose, or special-purpose, hardware computing device, including but not limited to, web browsers and apps on desktop computers, laptops, tablets, TV consoles, smart TVs, and the like.

FIG. 2 shows a screenshot 200 of a virtual fitness application before a fitness activity has started, in accordance with an exemplary embodiment of the present invention. The user 102 from FIG. 1 is shown in the video frame of the virtual fitness application's graphical user interface (hereinafter, "GUI"). Note that the user 102 has not started the fitness activity yet, so there are no statistics shown in the lower portion of the GUI in screenshot 200.

Screenshot 200 shows a GUI of the virtual fitness application running on a mobile computing device, for example mobile device 104. However, embodiments of the present invention may include GUIs on any general-purpose, or special-purpose, hardware computing device, including but not limited to, web browsers and apps on desktop computers, laptops, tablets, TV consoles, and the like.

FIG. 3 shows a screenshot 300 of the virtual fitness application with user statistics annotated during a fitness activity, in accordance with an exemplary embodiment of the present invention. The user 102 from FIGS. 1 and 2 is now engaged in the fitness activity (that, is running or jogging-in-place). GUI element 302 displays a leaderboard which shows all users of the system and their accumulated statistics. These accumulated statistics can include any performance metrics associated with the system and its users, in various embodiments of the invention. In one embodiment of the present invention, the user may experience running with other people virtually, compete in virtual fitness competitions, and the like, for example, as shown in leaderboard GUI element 302. The user may participate in solo fitness exercises, as well as in group and virtual fitness tournaments with multiple players ("tournament mode"), battles with other player ("battle mode"), and so on. The fitness tournaments may be live (synchronous) or asynchronous in time.

The user may also see their individual fitness statistics in the GUI, whether during individual or group training exercises. For example, GUI element 304 displays speed-related information, for example, cadence (e.g., steps per minute), power output (e.g., watts), speed (e.g., miles per hour), and so on. The current time is also shown in the bottom of the GUI. GUI element 306 displays all accumulated statistics associated with the current activity, for example, calorie consumption (e.g., kcal), total number of steps taken, total distance traveled (e.g., miles or km), and so on.

The statistics shown in screenshot 300 are primarily related to running, jogging, and/or walking for illustrative purposes. However, embodiments of the present invention may display statistics related to any fitness activity, including running, jogging, walking, jumping, performing jumping jacks, squatting, and/or dribbling, and the like. The statistics may be related to any repetitive, or quasi-repetitive, motions, including steps, jumps, squats, and/or dribbles, and the like.

Screenshot 300 shows a GUI of the virtual fitness application running on a mobile computing device. However, embodiments of the present invention may include GUIs on any general-purpose, or special-purpose, hardware computing device, including but not limited to, web browsers or apps on desktop computers, laptops, tablets, TV consoles, smart TVs, and the like.

FIG. 4 shows an illustrative computer-executed method 400 for implementing a virtual fitness application, in accordance with an embodiment of the present invention. The computer-executed method may be executed, for example, by a hardware processor with access to a non-transitory storage medium that stores program code that causes the processor to execute these steps, as described below. In step 402, the processor receives a video of a user from a camera on, connected to, or accessible by, a computing device. In step 404, the processor detects a sequence of human poses in the input video. In step 406, the processor counts one or more repetitive motions of a fitness activity within the sequence of human poses. In step 408, the processor computes a plurality of statistics about the fitness activity.

Finally, in step 410, the processor presents one or more gamification elements based on the statistics, for example, on a GUI associated with the mobile computing device 104. The processor that executes the method steps may be located on the mobile computing device 104, on the server (not shown), or processors on both the mobile computing device 104 and the server may share resources in order to execute the aforementioned steps.

Illustrative Repetitive Motion Counting Method for the Virtual Fitness Application There are various methods of repetitive motion counting that are within the scope of the present invention, and that all may be used to implement the virtual fitness application. One illustrative repetitive motion counting method is described next.

FIG. 5 shows an illustrative method 500 for repetitive motion counting within the virtual fitness application, in accordance with an embodiment of the present invention. The method 500 is based on computing delta values of (that is, changes over time in) Y-coordinates of one or more key points in a pose of a user in the input video. The method 500 shown in FIG. 5 includes the following steps:

In step 502, the processor detects a sequence of human poses for each frame in an input video (e.g., in a sequence of frames). The processor may use any pose estimation process or algorithm to detect the human pose in each frame, as described in greater detail below with respect to an illustrative pose estimation process.

In step 504, for each frame, the processor selects a proper pose as the user (or the main pose) of the activity. For example, the processor may detect multiple poses (or multiple players) in a given frame, and will select one of those poses as the proper pose. The selection of the proper pose may be determined in any number of ways. In one embodiment, the most centered pose (e.g., that user pose that is most centrally located in the frame) may be selected as the proper pose. For example, if the processor has detected multiple poses in a given frame, corresponding to multiple players, the processor may select the most centered one as the user to track for that given frame. In another embodiment, a human tracking algorithm may be used to select the proper pose. In one embodiment, the human tracking algorithm may consider poses from both previous and subsequent video frames, in addition to poses in the current video frame.

In step 506, for the proper pose in each frame, the processor computes Y-coordinates of one or more key points of the proper pose. In some embodiments, the key points are body joints of the user. In other embodiments, the key points are a nose, an eyes, an ears, a chest, and/or a shoulders of the user. Any suitable key points in the proper pose may be utilized. The Y-coordinates generally correspond to the vertical dimension in the image plane of each frame, and generally correspond to increasing heights in the real-world coordinates. Generally, positive Y-coordinates correspond to increasing heights above the ground plane. For example, a higher Y-coordinate corresponds to a greater height above the ground plane in real-world coordinates. This is just one coordinate system that may be used with embodiments of the present invention, and any appropriate coordinate system may be used to implement the present invention.

In step 508, optionally the processor applies a smoothing function on the Y-coordinates of the key points of the proper pose. The smoothing function may be any useful smoothing function, for example, a smoothing function may be, but is not limited to, moving average, additive smoothing, Butterworth filter, elliptic filter, exponential smoothing, Kernel smoothing, Laplacian smoothing, low-pass filter, smoothing spline, or any other appropriate smoothing function.

In step 510, the processor computes delta values ($y_t - y_{t-1}$), corresponding to Y-coordinate changes over time (e.g., between frames), of one or more key points of the proper pose.

In step 512, the processor computes a function of the delta values for the key points of the proper pose. The function may be a mean (average), a median, a single delta value while eliminating extreme variations (extremes removed), and so on. For example, in step 512, the processor computes an average of the delta values for the key points of the proper pose (for example, a moving average as the frame sequence progresses through time).

In step 514, the processor counts a given user movement as a repetitive motion based on the function of the delta values. For example, if the function in step 512 is a mean (average), and if the mean delta value starts positive (delta>0), then becomes negative (delta<0), and then becomes positive (delta>0) again, then the processor counts that particular user movement as a repetitive motion. (As opposed to, for example, random noise, movement of the shirt, wind, and so on.) Note that in this context, larger Y-coordinates correspond to higher positions in physical space; that is, delta>0 corresponds to the user going up in physical space.

In step 516, optionally the processor performs a checking process on each user movement's metrics to invalidate a given user movement based on one or more criteria (e.g., those that are not reasonable). For example, the processor may exclude user movements whose rising period is more than a given time period (e.g., 1 second because a step won't last that long), or whose rising amplitude is smaller than a certain threshold (e.g., an inch because a step won't be that short).

In some embodiments, the following steps may be performed by the processor in order to perform the checking process. In one embodiment, the processor may make the checking process more loose or strict dynamically under different detection sensitivity requirements, based on a detection sensitivity parameter. For example, for fast jogging, the amplitude of the delta values of the key points is smaller, so the processor may loosen the checking process. In one embodiment, the processor may use a limb movement (e.g., a hand swing or a leg movement) to control the checking process, so that counting is harder to miss if the processor determines that the user is running.

FIG. 6 shows a diagram 600 illustrating the repetitive motion counting method corresponding to FIG. 5. The proper pose 603 detected is shown illustratively on the right (in stick figure format) overlaid over an image of the user 601. For illustrative purposes only, graph 602 illustrates trajectories of the Y-coordinates of the key points of the user 601. In graph 602, illustrative key points of the nose, the eyes, the ears, the chest, and the shoulders of the user 601 are shown plotted over time. In diagram 600, the processor has counted "10" repetitive motions (e.g., steps) from the start of the fitness activity to the present time.

The illustrative repetitive motion counting method illustrated schematically in diagram 600 is primarily directed to running, jogging, and/or walking for illustrative purposes. However, embodiments of the present invention may count repetitive, or quasi-repetitive, motions related to any fitness activity, including running, jogging, walking, jumping, performing jumping jacks, squatting, and/or dribbling, and the like. That is, embodiments of the present invention may count any repetitive, or quasi-repetitive, motions, including steps, jumps, squats, dribbles, and the like. A similar, or somewhat similar, algorithm as described herein would apply to counting any of these types of repetitive motions, or their equivalents.

NEX Platform

FIG. 7 is a schematic diagram illustrating functionalities provided by an extended NEX platform 700, according to one embodiment of the present invention. Discussions within the present application have emphasized live motions of fitness activities 720 that are processed in real-time by NEX computing device 750 to generate real-time analytics of the fitness activities 770. In some embodiments, NEX platform 700 may also capture fitness activities 730 and provide later replay of the recorded activities with analytics 780. Furthermore, NEX platform 700 may also receive on-demand capture and recordings of past activities 710, such as prior fitness sessions, for post-processing within NEX computing device 750, and/or instant or on-demand replay and content sharing of the past activities 760.

Although NEX computing device 750 as shown in FIG. 7 serves as the core for NEX platform 700, in some embodiments, NEX platform 700 may be networked among multiple user devices, where a NEX server may be connected to multiple camera-enabled user computing devices, each used to capture user or activity data, and for providing analytics. Such video and/or analytics data may be uploaded to the NEX server, which in turn may store and facilitate sharing of such data among individual users, or participants of an online fitness community. Examples of fitness community events include, but are not limited to, virtual fitness tournaments ("tournament mode"), battles between various players ("battle mode"), and the like. The tournaments and battles may be real-time (synchronous) or asynchronous in time.

Implementation Using Computer Program Products, Methods, and Computing Entities

Exemplary System Architecture

An exemplary embodiment of the present disclosure may include one or more user computing entities 800, one or more networks, and one or more server or management computing entities 900, as shown in FIGS. 8 and 9. Each of these components, entities, devices, systems, and similar words used herein interchangeably may be in direct or indirect communication with, for example, one another over the same or different wired or wireless networks. Additionally, while FIGS. 8 and 9 illustrate the various system entities as separate, standalone entities, the various embodiments are not limited to this particular architecture.

Exemplary User Computing Entity

FIG. 8 is an exemplary schematic diagram of a user computing device 800 for implementing a virtual fitness application, according to exemplary embodiments of the present invention. A user operates a user computing device 800 that includes one or more components as shown. As will be recognized, these architectures and descriptions are provided for exemplary purposes only and are not limiting to the various embodiments.

In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, retrieving, operating on, processing, displaying, storing, determining, creating, generating, generating for display, monitoring, evaluating, comparing, and/or similar terms used herein interchangeably. In various embodiments, these functions, operations, and/or processes can be performed on data, content, information, and/or similar terms used herein interchangeably. Furthermore, in embodiments of the present invention, user computing device 800 may be a mobile device, and may be operated by a user participating in an interactive physical training activity. On the other hand, a NEX server may be implemented according to the exemplary schematic diagram shown in FIG. 9, possibly in the cloud, and possibly with logically or physically distributed architectures.

As shown in FIG. 8, the user computing entity 800 may include an antenna 870, a radio transceiver 820, and a processing unit 810 that provides signals to and receives signals from the transceiver. The signals provided to and received from the transceiver may include signaling information in accordance with air interface standards of applicable wireless systems. In this regard, the user computing entity 800 may be capable of operating with one or more air interface standards, communication protocols, modulation types, and access types. More particularly, the user computing entity 800 may operate in accordance with any of a number of wireless communication standards and protocols. In some embodiments, user computing entity 800 may operate in accordance with multiple wireless communication standards and protocols, such as 5G, UMTS, FDM, OFDM, TDM, TDMA, E-TDMA, GPRS, extended GPRS, CDMA, CDMA2000, 1×RTT, WCDMA, TD-SCDMA, GSM, LTE, LTE advanced, EDGE, E-UTRAN, EVDO, HSPA, HSDPA, MDM, DMT, Wi-Fi, Wi-Fi Direct, WiMAX, UWB, IR, NFC, ZigBee, Wibree, Bluetooth, and/or the like. Similarly, the user computing entity 800 may operate in accordance with multiple wired communication standards and protocols, via a network and communication interface 822.

Via these communication standards and protocols, the user computing entity 800 can communicate with various other computing entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). User computing entity 800 can also download changes, add-ons, and updates, for instance, to its firmware, software (e.g., including executable instructions, applications, program modules), and operating system.

In some implementations, processing unit 810 may be embodied in several different ways. For example, processing unit 810 may be embodied as one or more complex programmable logic devices (CPLDs), microprocessors, multi-core processors, coprocessing entities, application-specific instruction-set processors (ASIPs), microcontrollers, and/or controllers. Further, the processing unit may be embodied as one or more other processing devices or circuitry. The term circuitry may refer to an entirely hardware embodiment or a combination of hardware and computer program products. Thus, processing unit 810 may be embodied as integrated circuits, application specific integrated circuits (ASICs), field programmable gate arrays (FPGAs), programmable logic arrays (PLAs), hardware accelerators, other circuitry, and/or the like. As will therefore be understood, processing unit 810 may be configured for a particular use or configured to execute instructions stored in volatile or non-volatile media or otherwise accessible to the processing unit. As such, whether configured by hardware or computer program products, or by a combination thereof, processing unit 810 may be capable of performing steps or operations according to embodiments of the present invention when configured accordingly.

In some embodiments, processing unit 810 may comprise a control unit 812 and a dedicated arithmetic logic unit 813 (ALU) to perform arithmetic and logic operations. In some embodiments, user computing entity 800 may optionally comprise a graphics processing unit 840 (GPU) for specialized image and video rendering tasks, and/or an artificial intelligence (AI) accelerator 842, specialized for applications including artificial neural networks, machine vision, and machine learning. In some embodiments, processing unit 810 may be coupled with GPU 840 and/or AI accelerator 842 to distribute and coordinate processing tasks.

In some embodiments, user computing entity 800 may include a user interface, comprising an input interface 850 and an output interface 852, each coupled to processing unit 810. User input interface 850 may comprise any of a number of devices or interfaces allowing the user computing entity 800 to receive data, such as a keypad (hard or soft), a touch display, a mic for voice/speech, and a camera for motion or posture interfaces. User output interface 852 may comprise any of a number of devices or interfaces allowing user computing entity 800 to provide information to a user, such as through the touch display, or a speaker for audio outputs. In some embodiments, output interface 852 may connect user computing entity 800 to an external loudspeaker or projector, for audio or visual output.

User computing entity 800 may also include volatile and/or non-volatile storage or memory 830, which can be embedded and/or may be removable. A non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store an operating system 814, application software 816, data 818, databases, database instances, database management systems, programs, program modules, scripts, source code, object code, byte code, compiled code, interpreted code, machine code, executable instructions, and/or the like to implement the functions of user computing entity 800. As indicated, this may include a user application that is resident on the entity or accessible through a browser or other user interface for communicating with a management computing entity and/or various other computing entities.

In some embodiments, user computing entity 800 may include location determining aspects, devices, modules, functionalities, and/or similar words used herein interchangeably. For example, user computing entity 800 may include outdoor positioning aspects, such as a location module adapted to acquire, for example, latitude, longitude, altitude, geocode, course, direction, heading, speed, universal time (UTC), date, and/or various other information/data. In one embodiment, the location module may acquire data, sometimes known as ephemeris data, by identifying the number of satellites in view and the relative positions of those satellites. Alternatively, the location information may be determined by triangulating the user computing entity's position in connection with a variety of other systems, including cellular towers, Wi-Fi access points, and/or the like. Similarly, user computing entity 800 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

In an interactive fitness session, a user computing entity 800 may be deployed (e.g., installed; configured; accepted; installed and accepted; configured and accepted; installed, configured, and accepted; or the like) in a training area that includes other players and/or game equipment. In some embodiments, at least one input device on user computing entity 800 may collect or may be configured to collect information (e.g., data, metadata, and/or signaling) indicative of operational features of the training area and/or equipment for analysis by processing unit 810.

In some embodiments, a system for implementing the virtual fitness application may include at least one user computing device 800, such as a mobile computing device, and optionally a mounting apparatus for the at least one mobile computing device. The mounting apparatus may be a tripod (as shown in FIG. 1) or a kickstand, and may mount the electronic device with a camera of the user computing device positioned to monitor a training area. In some embodiments, the user computing device may be hand-held or put on the ground leaning against certain articles, such as a water bottle or backpack. In some embodiments, the system for implementing the virtual fitness application further comprises a sound device, for example, earbuds (e.g., wireless earbuds) or a speaker system (e.g., a public address (PA) system) coupled to the at least one user computing device. The sound device may serve to provide instruction and feedback regarding a fitness session to the user. In some embodiments, the system optionally comprises an optical device such as a projector, a projection lamp, a laser pointing system, a jumbotron, a television screen, or the like, that can facilitate an interactive fitness session.

In some embodiments, user computing entity 800 may communicate to external devices like other smartphones and/or access points to receive information such as software or firmware, or to send information (e.g., training data such as analytics, statistics, scores, recorded video, etc.) from the memory of the user computing device to external systems or devices such as servers, computers, smartphones, and the like.

In some embodiments, two or more users may establish a connection between their computing devices using a network utilizing any of the networking protocols listed previously. At least two of the users may be in geographically different areas. In some embodiments, the user computing devices 800 may use a network interface such as 822 to communicate with various other computing entities, such as by communicating data, content, information, and/or similar terms used herein interchangeably that can be transmitted, received, operated on, processed, displayed, stored, and/or the like.

In some embodiments, data such as statistics, scores, and videos may be uploaded by one or more user computing devices 800 to a server such as shown in FIG. 9 when the user computing device 800 accesses a network connection, such as a wireless access point or hotspot. The data transfer may be performed using protocols like file transfer protocol (FTP), MQ telemetry transport (MQTT), advanced message queuing protocol (AMQP), hypertext transfer protocol (HTTP), and HTTP secure (HTTPS). These protocols may be made secure over transport layer security (TLS) and/or secure sockets layer (SSL).

In some embodiments, audio generated by a user computing device and/or audio generated by one or more users may be used to facilitate an interactive session. In some embodiments, audio may be used to (i) direct users to particular positions on training areas (with further audio feedback to help the users locate themselves more accurately), (ii) inform users about a motion or action that a user needs to do as part of the training (e.g., shoot a ball at a basket, perform a back flip, perform an exercise such as pushups, and the like), (iii) provide feedback to the user (e.g., to inform them if the users are making a wrong move, running out of time, have successfully completed a given drill, or achieved a particular score), or (iv) report on the progress of the session (statistics, leaderboard, and the like). In some embodiments, speech recognition and corresponding responses (e.g., audio, visual, textual, etc. responses) may also be used to facilitate the session by allowing users to set options, correct mistakes, or start or stop the session.

In some embodiments, artificial intelligence-based computer vision algorithms may be used to perform at least one of the following: (i) ensure that users are located where they should be, (ii) determine when/if users successfully complete a task, (iii) rank the quality of users' motion/action, (iv) award quality points or other attributes depending on the nature of the users' motion, and/or (v) detect and count repetitive motions of a user (e.g., steps associated with running in place, jogging in place, etc.).

In various embodiments, during the physical activities performed by users, the mobile computing device may not be on the user's person, and instructions may be given via a speaker or other remote devices connected to the mobile device. Further, computer vision algorithms may be used on the mobile device to guide and monitor the user being conducted within the mobile device camera's field of view. Accordingly, embodiments of devices described herein can employ artificial intelligence (AI) to facilitate automating one or more features of functionalities as described herein.

To provide for or aid in the numerous determinations (e.g., determine, ascertain, infer, calculate, predict, prognose, estimate, derive, forecast, detect, compute) of settings, player postures and player analytics described herein, components described herein may examine the entirety or a subset of data to which it is granted access and can provide for reasoning about or determine states of the system or environment from a set of observations as captured via events and/or data. Determinations may be employed to identify a specific context or action, or may generate a probability distribution over states, for example. The determinations may be probabilistic. That is, the computation of a probability distribution over states of interest based on a consideration of data and events. Determinations may also refer to techniques employed for composing higher-level events from a set of events and/or data.

Such determinations may result in the construction of new events or actions from a set of observed events and/or stored event data, whether the events are correlated in close temporal proximity, and whether the events and data come from one or several event and data sources. For example, running instructions and feedbacks to player may be generated from one or more analytics derived from user actions. Further, components disclosed herein may employ various classification schemes (e.g., explicitly trained via training data or implicitly trained via observing behavior, preferences, historical information, receiving extrinsic information, etc.) and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems may be used to automatically learn and perform a number of functions, actions, and/or determinations.

Exemplary Management Computing Entity

FIG. 9 is an exemplary schematic diagram of a management computing entity 900, such as a NEX server, for implementing a virtual fitness application, according to exemplary embodiments of the present invention. The terms computing entity, computer, entity, device, system, and/or similar words used herein interchangeably were explained in detail with reference to user computing entity 800.

As indicated, in one embodiment, management computing entity 900 may include one or more network or communications interface 920 for communicating with various computing entities, such as by communicating data, content, information, and/or similar terms used herein interchangeably that can be transmitted, received, operated on, processed, displayed, stored, and/or the like. For instance, management computing entity 900 may communicate with the user computing device 800 and/or a variety of other computing entities. Network or communications interface 920 may utilize a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, management computing entity 900 may be configured to communicate via wireless external communication networks using any of a variety of standards and protocols as discussed with reference to user computing device 800.

As shown in FIG. 9, in one embodiment, management computing entity 900 may include or be in communication with one or more processing unit 910 (also referred to as processors, processing circuitry, processing element, and/or similar terms used herein interchangeably) that communicate with other elements within the management computing entity 900. As will be understood, processing unit 910 may be embodied in a number of different ways. For example, as one or more CPLDs, microprocessors, multi-core processors, coprocessing entities, ASIPs, microcontrollers, and/or controllers, in the form of integrated circuits, application specific integrated circuits (ASICs), field programmable gate arrays (FPGAs), programmable logic arrays (PLAs), hardware accelerators, other circuitry, and/or the like. As will therefore be understood, processing unit 910 may be configured for a particular use or configured to execute instructions stored in volatile or non-volatile memory or media 930 and 940. As such, whether configured by hardware or computer program products, or by a combination thereof, processing unit 910 may be capable of performing steps or operations according to embodiments of the present disclosure when configured accordingly.

Although not shown explicitly, management computing entity 900 may include or be in communication with one or more input elements, such as a keyboard, a mouse, a touch screen/display, a camera for motion and movement input, a mic for audio input, a joystick, and/or the like. Management computing entity 900 may also include or be in communication with one or more output elements such as speaker, screen/display, and/or the like.

In various embodiments, one or more of the components of management computing entity 900 may be located remotely from other management computing entity components, such as in a distributed system or in the cloud. Furthermore, one or more of the components may be combined and additional components performing functions described herein may be included in the management computing entity 900.

Machine Vision and Machine Learning Modules

As described herein, embodiments of the present invention use one or more artificial intelligence, machine vision, and machine learning algorithms or modules for analyzing videos and facilitating repetitive motion detection and characterization, such as detecting steps associated with running in place and/or jogging in place. Various exemplary machine vision algorithms are within the scope of the present invention used for performing pose estimation, gesture recognition, object recognition, and so forth. The following description describes in detail some illustrative machine vision and machine learning algorithms for implementing some embodiments of the present invention.

Illustrative Machine Vision Architectures

Some exemplary machine vision algorithms utilize a deep learning network (DLN), for example a convolutional neural network (CNN). Neural networks are computer systems inspired by architecture of the human brain. They can be viewed as parallel, densely interconnected computational models that adaptively learn through automatic adjustment of system parameters based on training data. Input information are modified based on system parameters when traversing through layers of interconnected neurons or nodes, to activate or trigger particular outputs. The design of a neural network refers to the configuration of its architecture or topology, or the specific arrangements of layers and nodes in the network. The applicability, utility, and optimality of a neural network, and the framework in which the neural network is deployed are often mutually interdependent. Convolutional Neural Networks (CNNs) utilize the process of convolution to reduce the number of model parameters involved, while successfully capturing the spatial and temporal dependencies in an image.

Figure 10:
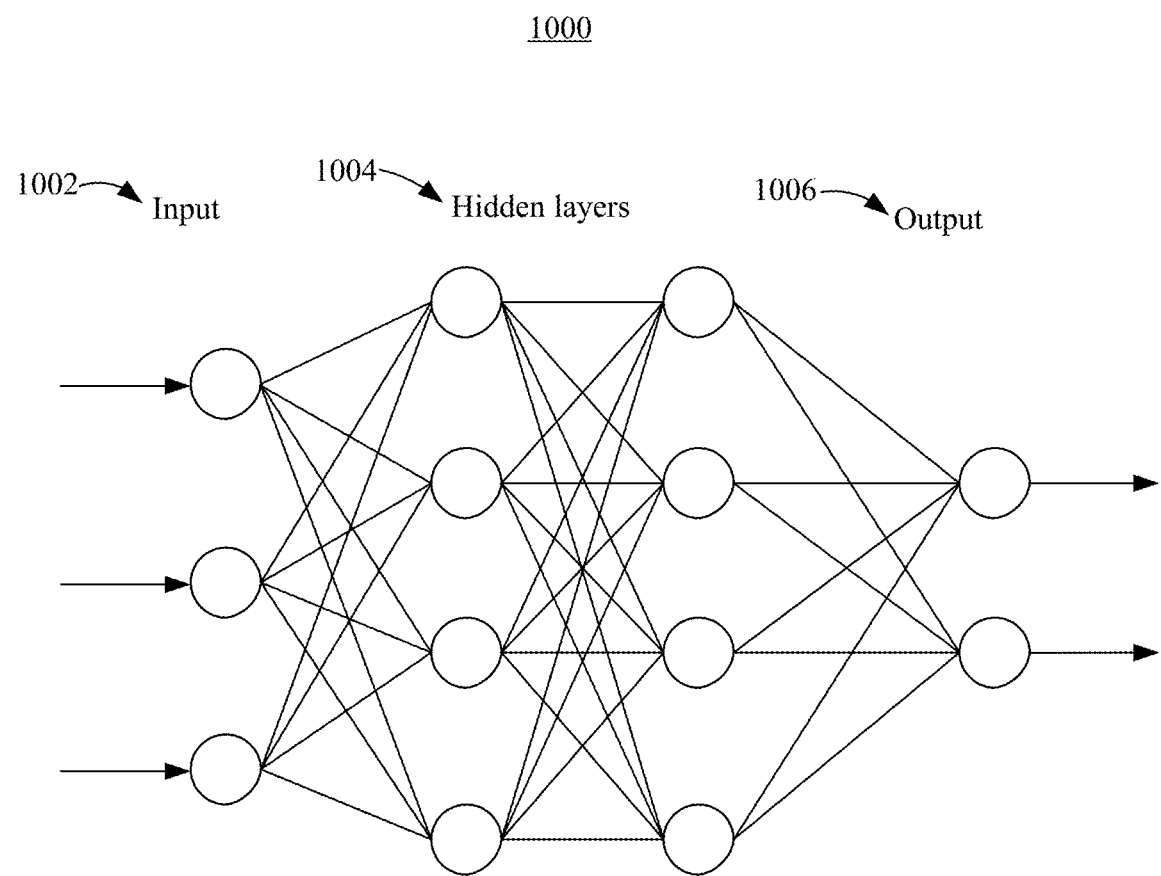
FIG. 10 shows an illustrative block diagram of a convolutional neural network (CNN) for image analysis, according to exemplary embodiments of the present invention.

More specifically, FIG. 10 shows an illustrative block diagram 1000 of a convolutional neural network (CNN) for image analysis and object recognition, according to exemplary embodiments of the present invention. This exemplary CNN module 1000 may be utilized for implementing various machine vision algorithms described herein. For example, it may be designed and trained to determine gestures and poses and other machine vision tasks required by the present invention, as would be recognized by one of ordinary skill in the art. An input layer 1002 is connected via a multiplicity of hidden layers 1004 to an output layer 1006. Input layer 1002 is a map for pixels of an input image. Exemplary hidden layers may include, but are not limited to, convolutional layers, Rectified Linear Units (ReLU), pooling layers, normalization layers, and fully connected layers. A convolutional layer applies a convolution or correlation operation by a kernel matrix to the input data to generate a feature map of the input image. ReLU is a non-linear activation function. Pooling layers reduce the dimensionality of the data to decrease the required computational power. A fully connected layer has full connections to all activations in the previous layer, and is needed before classification or output activation at output layer 1006. Successive convolution-ReLU-pooling stages allow the successive extraction of low-level to high-level features, from edges, general shapes such as lines and circles, to specific shapes representing specific objects.

FIG. 13A to 13E provide exemplary block diagrams of a detailed neural network design for a pose estimation process. FIG. 10 shows only one illustrative CNN architecture that is within the scope of the present invention, but the present invention is not limited to the use of CNNs. Other machine vision algorithms are also within the scope of the present invention.

Illustrative Machine Learning Architectures

Figure 11:
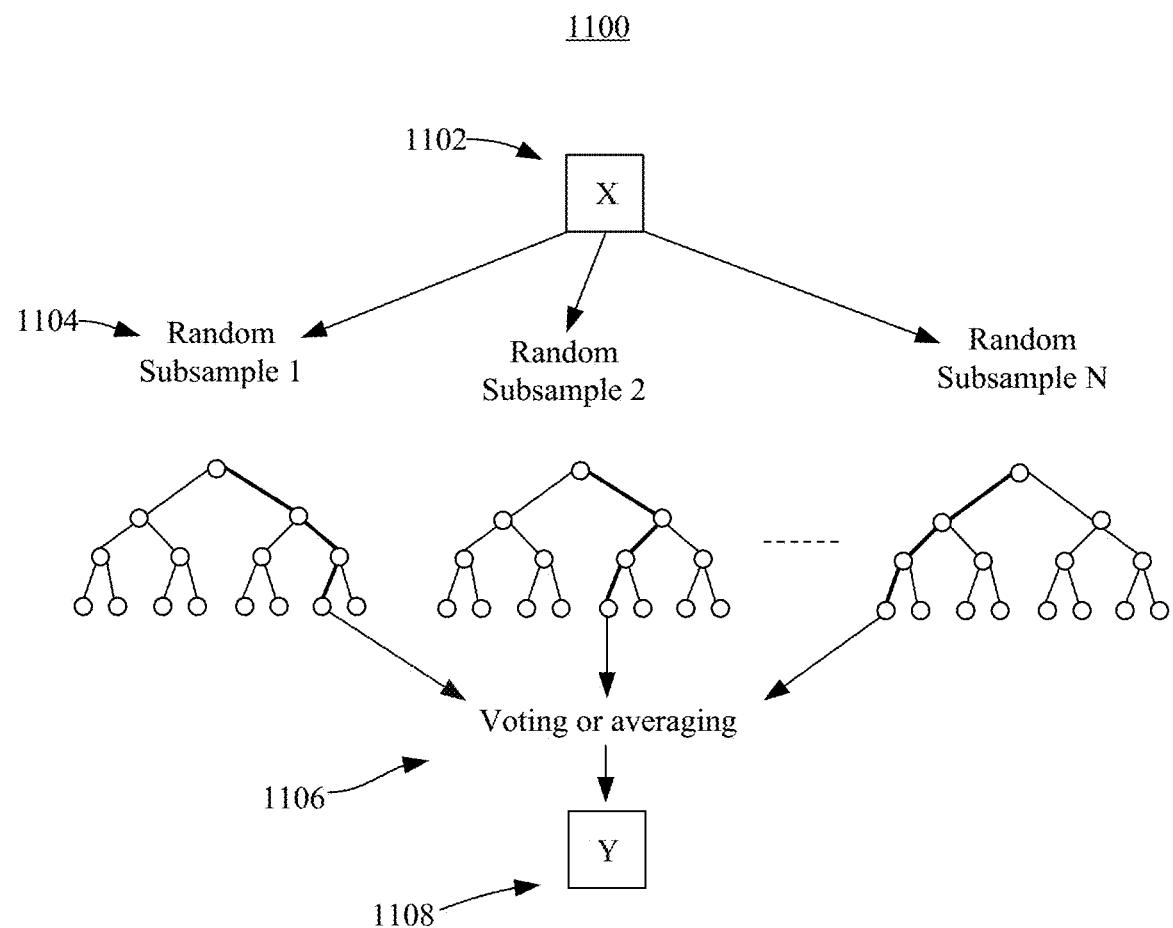
FIG. 11 shows an illustrative block diagram for a machine learning algorithm, according to exemplary embodiments of the present invention.

As stated herein, various exemplary machine vision and machine learning algorithms are within the scope of the present invention for performing pose estimation, gesture recognition, object recognition, and so forth. FIG. 11 shows an illustrative block diagram 1100 for a machine learning algorithm, according to exemplary embodiments of the present invention.

In particular, a supervised machine learning algorithm is shown, comprising an illustrative random forest algorithm. Random forest algorithms are a method for classification and regression. By using a multitude of decision tree predictors 1104, each depending on the values of a random subset of a training data set 1102, the chances of overfitting to the training data set may be minimized. The decision tree predictors are voted or averaged at a decision step 1106 to obtain predictions 1108 of the random forest algorithm. For the task of object recognition, input 1102 to the machine learning algorithm may include feature values, while output 1108 may include predicted gestures and/or poses associated with a user. Random forest is only one illustrative machine learning algorithm that is within the scope of the present invention, and the present invention is not limited to the use of random forest. Other machine learning algorithms, including but not limited to, nearest neighbor, decision trees, support vector machines (SVM), Adaboost, Bayesian networks, various neural networks including deep learning networks, evolutionary algorithms, and so forth, are within the scope of the present invention.

In short, embodiments of devices, systems, and their various components described herein may employ artificial intelligence (AI) to facilitate automating one or more functions described herein, including pose estimation, gesture recognition, and object recognition.

Training Machine Learning Algorithms

Figure 12:
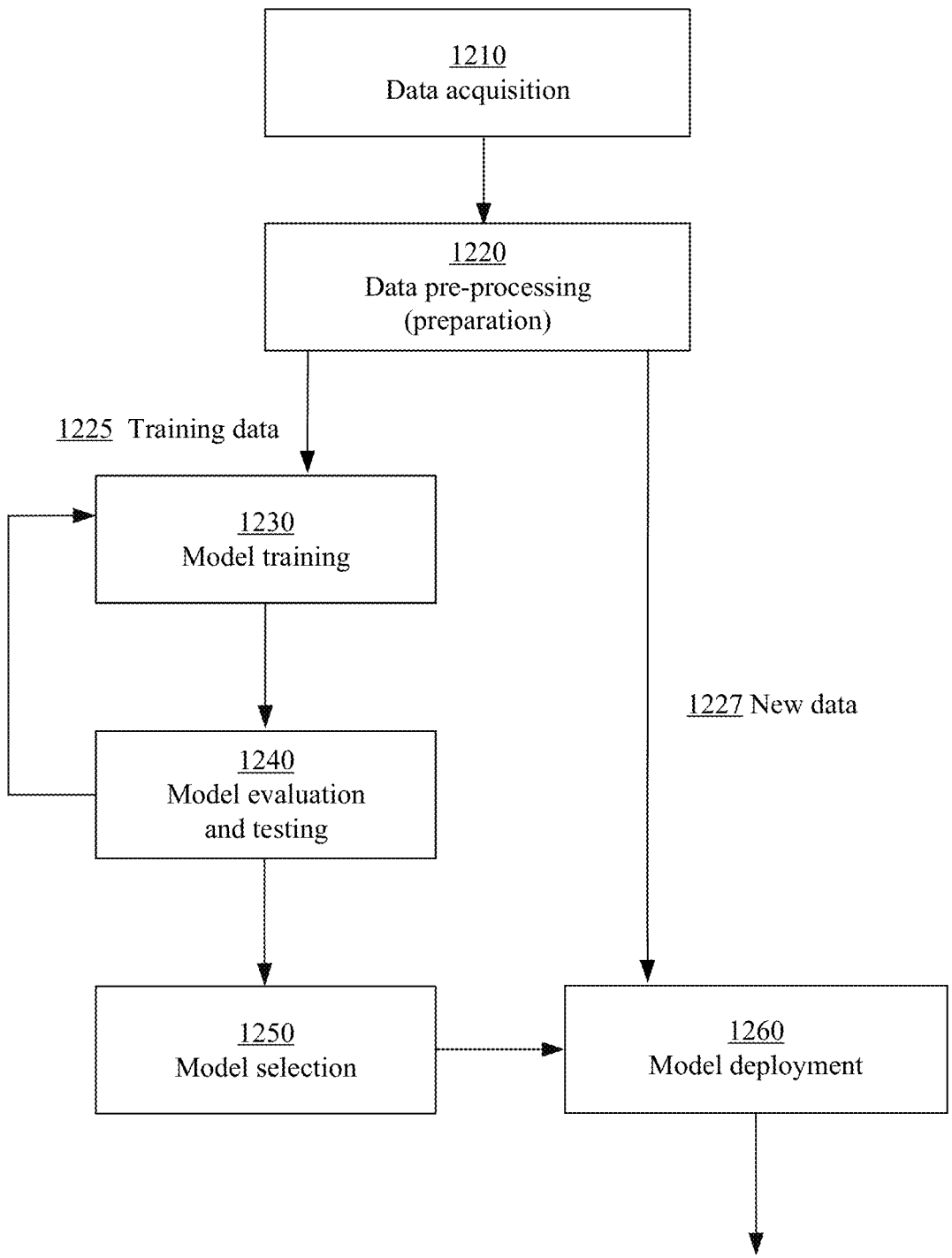
FIG. 12 shows an illustrative flow diagram for training a machine learning algorithm, according to exemplary embodiments of the present invention.

FIG. 12 shows an exemplary flow diagram 1200 for training a machine learning (ML) algorithm, which may be utilized in pose estimation, object recognition, and object flow construction, according to exemplary embodiments of the present invention;

The training process begins at step 1210 with data acquisition. At step 1220, acquired data are pre-processed, or prepared. At step 1230, a machine learning model is trained using training data 1225. At step 1240, the model is evaluated and tested, and further refinements to the model are fed back into step 1230. At step 1250, optimal model parameters are selected, for deployment at step 1260. New data 1227 may be used by the deployed model to make predictions.

A starting point for any machine learning method such as used by the machine learning component above is a documented dataset containing multiple instances of system inputs and correct outcomes (e.g., training data 1225). This data set may be used, using methods known in the art, including but not limited to standardized machine learning methods such as parametric classification methods, non-parametric methods, decision tree learning, neural networks, methods combining both inductive and analytic learning, and modeling approaches such as regression models, to train the machine learning system and to evaluate and optimize the performance of the trained system. Thus, it would be understood by peoples of ordinary skill in the art that "training data" 1225 as referred to in this subsection are directed to data for training a machine vision algorithm or a machine learning algorithm.

The quality of the output of the machine learning system depends on (a) pattern parameterization, (b) learning machine design, and (c) quality of the training database. These components may be refined and optimized using various methods. For example, the database may be refined by adding datasets for new documented gestures and poses. The quality of the database may be improved, for example, by populating the database with cases in which the gestures and/or poses were correctly recognized. In one embodiment, the database includes data, for example, of mistaken identification of gestures and/or poses, which may assist in the evaluation of a trained system.

Pose Estimation Process Using Convolutional Neural Networks (CNNs)

Figure 13A:
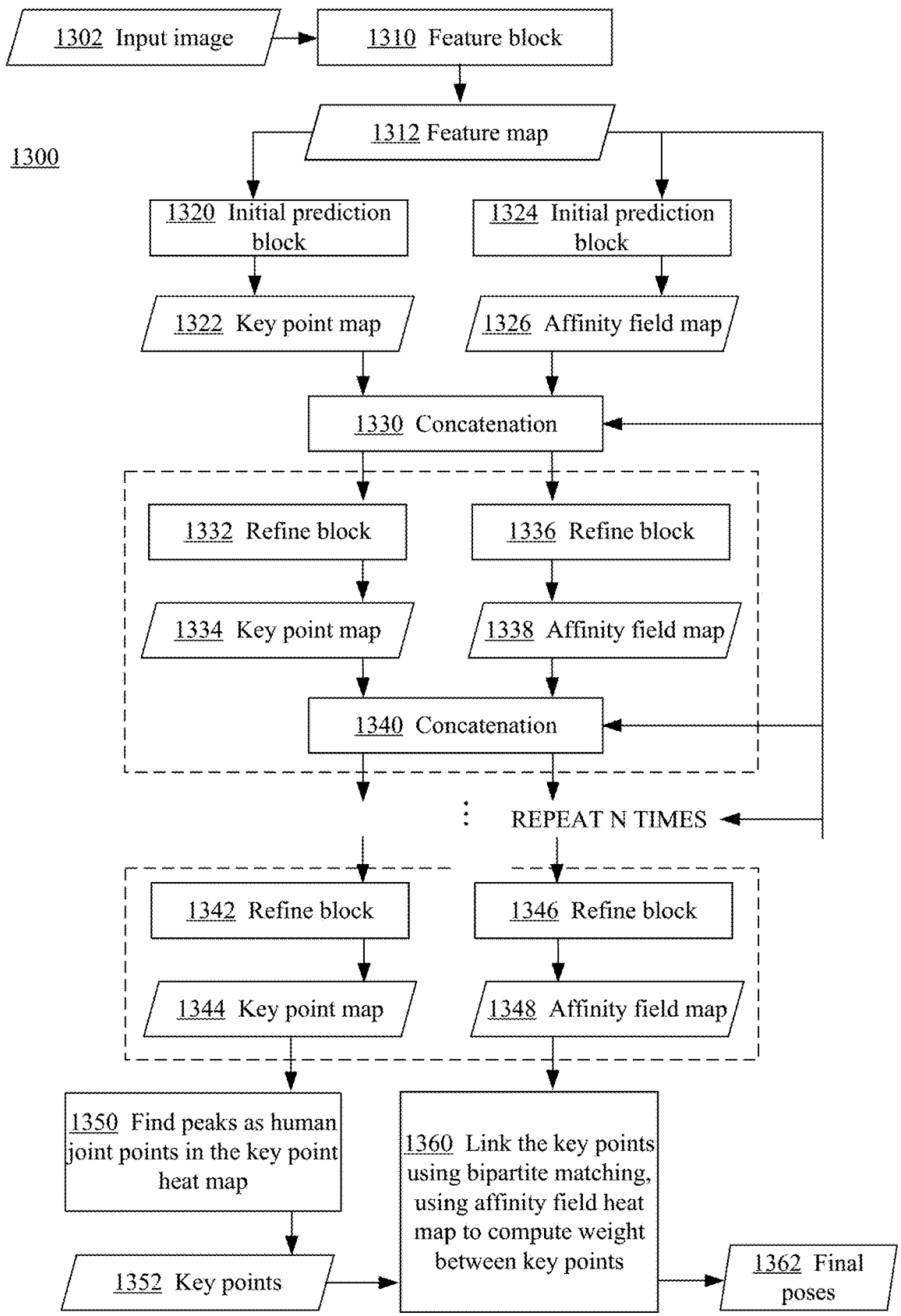
FIG. 13A is a block diagram of an exemplary neural network for a pose estimation process, according to exemplary embodiments of the present invention.

FIG. 13A is a block diagram 1300 of an exemplary neural network for a pose estimation process, according to some embodiments of the present invention. In this illustrative example, a two-branch CNN efficiently detects poses of multiple people in an input image by predicting part confidence maps for body parts, and part affinity fields for body part-to-body part association, effectively decoupling the detection of a body part such as an arm or leg, and the assignment of the detected body part to an individual person. A part affinity field (PAF) is a 2D vector field that encodes the location and orientation of body parts including limbs over the image domain. A PAF encodes the association between body parts, where body parts belonging to the same person are linked.

The illustrative network shown in FIG. 13A performs the following steps to estimate the pose of one or more persons in an input image:

1. Use a convolutional network block as a feature extractor to compute a feature map from an input image.
2. Turn the feature map into a key point heat map and an affinity field heat map using another convolutional network block.
3. Refine the key point heat map and the affinity field heat map using yet another convolutional network block, and repeat for several times.
4. Use Rectified Linear Units (ReLU), separable convolutional layers and/or batch normalization techniques to improve the accuracy and performance of the network.
5. Compute final poses by linking the key points using the affinity field heat map.

More specifically, an input image 1302 is first passed through a feature block 1310 to generate a feature map 1312. Initial prediction blocks 1320 and 1324 then extract a key point map 1322 and an affinity field map 1326, respectively. A concatenation operation 1330 is performed before further refinements are carried out in multiple iterations. For each stage of iteration, refine blocks such as 1332, 1336, 1342, and 1346 predict refined key point maps such as 1334 and 1344, and refined affinity field maps such as 1338 and 1348, respectively. Concatenation operations such as 1340 are performed to generate input for the next stage. A total of N refinements may be carried out, where N may be any positive integer. For example, N may equal to 5 in some embodiments of the present invention. After the last refinement stage, key point heat map 1344 is examined in step 1350 to find peaks as human joint points or key points 1352. Such key points may be linked in step 1360 to generate final poses 1362, by performing bipartite matching using affinity field heat map 1348 to compute weights between key points. In this illustrative example, key point map 1344 may comprise 18 channels, while affinity field map 1348 may comprise 34 channels.

Figures 13B, 13C:
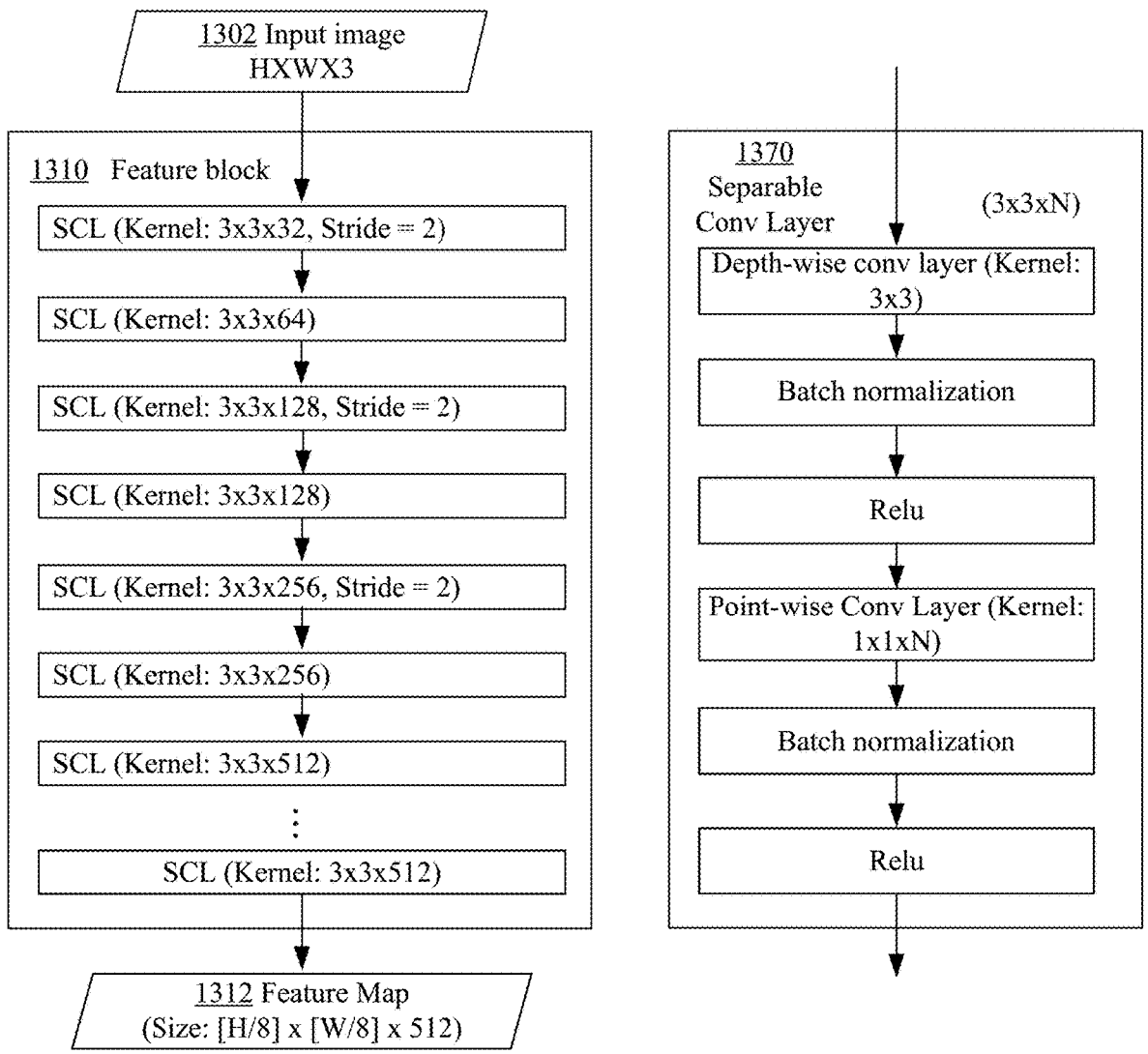
FIG. 13B is a detailed block diagram illustrating an exemplary Feature Block of FIG. 13A, according to exemplary embodiments of the present invention.
FIG. 13C is a detailed block diagram illustrating an exemplary separable convolutional neural network layer of FIG. 13A, according to exemplary embodiments of the present invention.

FIG. 13B is a detailed block diagram illustrating an exemplary Feature Block 1310, according to some embodiments of the present invention. In this example, separable convolutional layers (SCL) are deployed with different kernel and stride sizes.

Correspondingly, FIG. 13C is a detailed block diagram illustrating an exemplary separable convolutional neural network layer 1370, according to some embodiments of the present invention. A depth-wise separable convolution or a separable convolution layer factorizes a conventional, full convolution operation into a first depth-wise convolution to filter the input channels, and a second point-wise convolution to combine outputs of the depth-wise network layer to build a feature map. Depth-wise separable convolutions trade significant improvements in computational efficiency for a small reduction in accuracy. Batch optimization and ReLU blocks further help improve the accuracy and performance of the network layer. Furthermore, in some embodiments, inverted residuals may be utilized to connect linear bottleneck layers between individual depth-wise separable convolutional layers, which also tradeoff computation and accuracy. Linear bottleneck layers reduce the dimensionality of the input, while inverted residuals use shortcut connections between the bottlenecks to enable faster training and better accuracy.

FIG. 13D is a detailed block diagram illustrating an exemplary Initial Prediction Block 1320, according to some embodiments of the present invention; and FIG. 13E is a detailed block diagram illustrating an exemplary Refine Block 1332, according to some embodiments of the present invention. Both comprise multiple separable convolutional layers having different kernel sizes. The input, output, and kernel sizes shown in FIGS. 13A and 13E are for illustrative purposes only, and other similar hyperparameter values may be used in various embodiments of the present invention.

In some implementations of the present invention, one or more of existing software modules may be utilized, including but not limited to, CoreML for CNN object and key point detection, SceneKit for rendering an AR court, and CoreMotion for understanding a mobile device's orientation.

Object Detection Using Convolutional Neural Networks (CNNs)

Figure 14A:
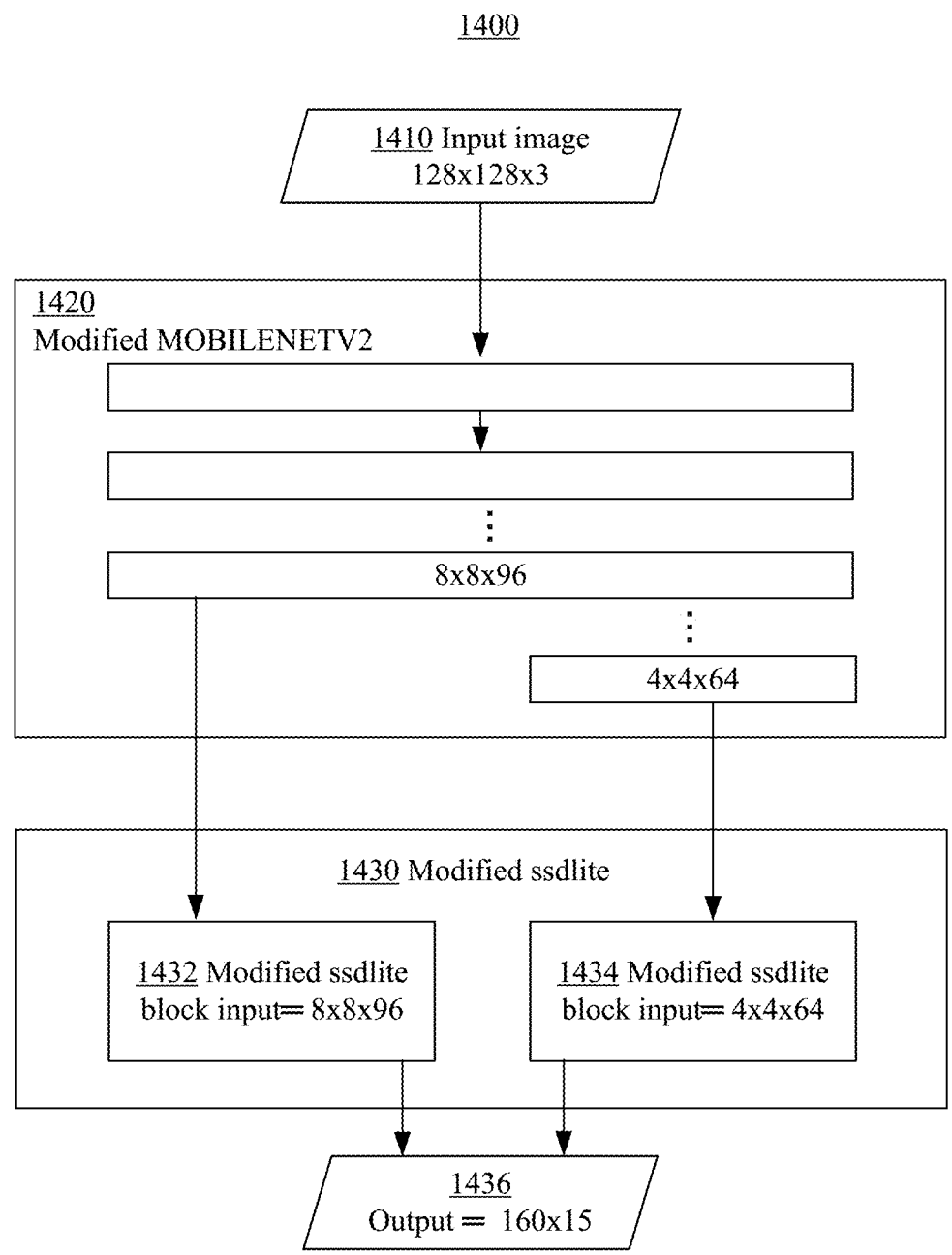
FIG. 14A is a block diagram of an exemplary neural network for object detection, according to one embodiment of the present invention.
Figure 14B:
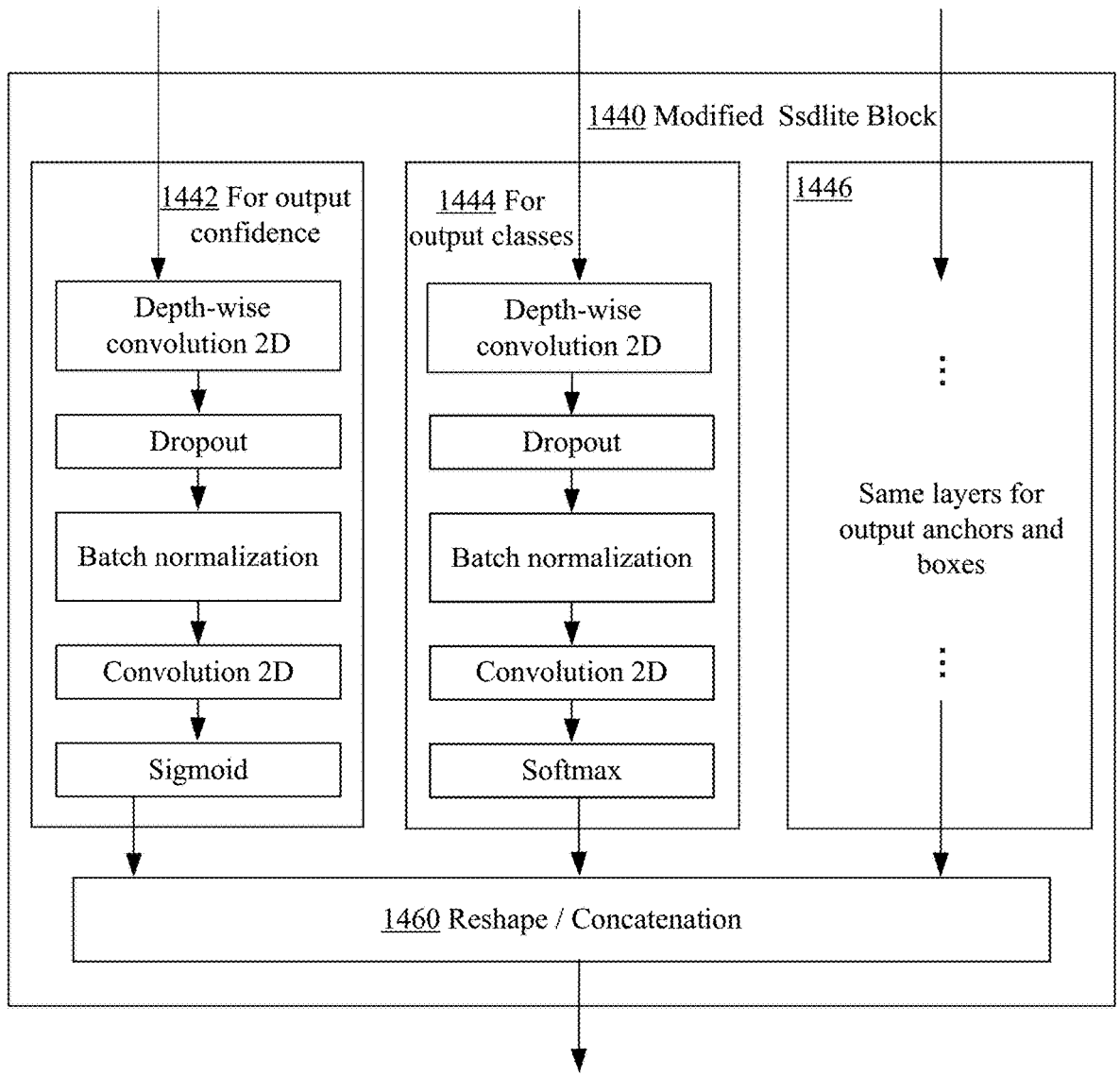
FIG. 14B is a detailed block diagram illustrating an exemplary Modified SSDLite Block of FIG. 14A, according to one embodiment of the present invention.

Many sports and corresponding performance training methods or techniques require additional equipment, such as a ball, hoop, marker cones, hurdles, batons, rackets, and the like. The detection of moving and/or static non-human objects from the training video is needed for some training activities to help determine player actions and player analytics. FIGS. 14A and 14B are respective block diagrams of an exemplary neural network for ball detection, according to one embodiment of the present invention. This object detector is presented for illustrative purposes only, and some embodiments of the present invention may utilize other computer vision system designs for object detection. Note that not all virtual fitness activity implementations require object detection.

FIG. 14A is a block diagram 1400 of an exemplary neural network for ball detection, according to some embodiments of the present invention. In particular, FIG. 14A shows a CNN-based ball detector utilizing an optimized, modified MobileNetV2 framework as a feature extractor and a modified SSDLite framework for multi-scale object detection. An input image 1410 is first processed through a Modified MobileNetV2 block 1420, the output of which is processed through a Modified SSDLite module 1430 comprising two Modified SSDLite blocks 1432 and 1434, to generate output 1436. The input, output, and kernel sizes shown in FIGS. 14A and 14B are for illustrative purposes only, and other similar hyperparameter values may be used in various embodiments of the present invention.

MobileNetV2 is a convolutional neural network design for resource-constrained, mobile device-based computer vision applications. A first key building block of MobileNetV2 is depth-wise separable convolutions, which factorize a conventional, full convolutional operation into a first depth-wise convolution to filter the input channels, and a second point-wise convolution to combine outputs of the depth-wise network layer to build a feature map. Depth-wise separable convolutions trade significant improvements in computational efficiency for a small reduction in accuracy. A second key building block of MobileNetV2 is inverted residuals connecting linear bottleneck layers between individual depth-wise separable convolutional layers, which also tradeoff computation and accuracy. Linear bottleneck layers reduce the dimensionality of the input, while inverted residuals use shortcut connections between the bottlenecks to enable faster training and better accuracy.

Although not shown explicitly in FIG. 14A, in this exemplary embodiment, two MobileNetV2 output layers and 14 bottleneck operators may be used, a non-obvious reduction from the conventional setup with 6 MobileNetV2 output layers and 17 bottleneck operators. Such modifications optimize the feature extraction process to not only reduce the overall computational complexity but also improve the achievable accuracy by tailoring to the specific small input and ball detection goal.

FIG. 14B is a detailed block diagram illustrating an exemplary Modified SSDLite Block, such as 1432 or 1434 in FIG. 14A, according to some embodiments of the present invention. SSD refers to a Single Shot MultiBox Detector, a multi-object detection framework using a single deep neural network to discretize feature maps into multi-scale bounding boxes. SSD eliminates separate bounding box proposal generation and feature resampling stages to improve computation efficiency without compromising detection accuracy. SSDLite is a mobile-customized variant that utilizes depth-wise separable convolution in SSD prediction layers. Modified SSDLite block 1440 shown in the exemplary embodiment of FIG. 14B further tailors and improves the accuracy of SSDLite by adding dropout layers.

More specifically, in Modified SSDLite Block 1440, parallel network blocks 1442, 1444, and 1446 are utilized to process the input data separately for output confidence, output classes, and output anchors and bounding boxes. Each block has the same architecture, comprising a depth-wise convolution in 2D space, dropout, batch normalization, further convolution, and a functional operation for classification. Feature maps thus generated are reshaped and/or concatenated via processing block 1460 to generate output data.

For the ball detection task, two positive object classes may be considered: "ball" and "ball-in-hand." With conventional SSD or SSDLite framework, a single softmax function may be used to activate among background (e.g., no positive), and these two classes. By comparison, Modified SSDLite Block 1440 is designed so that it may classify a ball out of a background, but does not always classify between ball and ball-in-hand for some training data. Such a design takes into account several factors. First, ball and ball-in-hand are not always distinguishable, even for a human. In addition to motion blur, background, and other objects such as leg, arm, other people in the background could look like a hand in terms of shape and/or color. Second, having a classifier distinguish between ball and ball-in-hand may not always be worthwhile and may even compromise detection accuracy since there are "gray areas" where an input may be classified either way. Instead, within Modified SSDLite Block 1440, a sigmoid function is used to produce confidence levels of whether a ball is present against a background, while a softmax function is used to classify between ball and ball-in-hand, or two output classes instead of three output classes for conventional SSD/SSDLite frames. As a further reduction to computational complexity, loss function and/or back propagation may be disabled if a given training case is in the "gray area."

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every end-user device is accommodated by the server to practice the methods of the present invention.

The present invention may be implemented in hardware and/or in software. Many components of the system, for example, signal processing modules or network interfaces etc., have not been shown, so as not to obscure the present invention. However, one of ordinary skill in the art would appreciate that the system necessarily includes these components. A computing device is a hardware that includes at least one processor coupled to a memory. The processor may represent one or more processors (e.g., microprocessors), and the memory may represent random access memory (RAM) devices comprising a main storage of the hardware, as well as any supplemental levels of memory, e.g., cache memories, non-volatile or back-up memories (e.g., programmable or flash memories), read-only memories, etc. In addition, the memory may be considered to include memory storage physically located elsewhere in the hardware, e.g., any cache memory in the processor, as well as any storage capacity used as a virtual memory, e.g., as stored on a mass storage device.

The hardware of a computing device also typically receives a number of inputs and outputs for communicating information externally. For interface with a user, the hardware may include one or more user input devices (e.g., a keyboard, a mouse, a scanner, a microphone, a camera, etc.) and a display (e.g., a Liquid Crystal Display (LCD) panel). For additional storage, the hardware may also include one or more mass storage devices, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware may include an interface to one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

The hardware operates under the control of an operating system, and executes various computer software applications, components, program code, libraries, objects, modules, etc. to perform the methods, processes, and techniques described above.

In general, the method executed to implement the embodiments of the invention may be implemented as part of an operating system or a specific application, component, program, object, module, or sequence of instructions referred to as "computer program(s)" or "program code(s)." The computer programs typically comprise one or more instructions set at various times in various memory and storage devices in a computing device or computer, and that, when read and executed by one or more processors in the computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), and digital and analog communication media.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A computer-implemented method executable by a hardware processor for implementing a single-user virtual fitness application, comprising:
    receiving an input video of one or more persons from a camera;
    detecting a sequence of human poses in the input video using a pose estimation process, wherein the pose estimation process is based on a Convolutional Neural Network (CNN);
    selecting a proper pose for a main user of the virtual fitness application, when the hardware processor has detected multiple poses in a given frame of the input video, to generate a sequence of proper poses;
    detecting one or more key points in the sequence of proper poses, the one or more key points having Y-coordinates;
    computing one or more delta values ($y_t$-$y_{t-1}$) corresponding to changes in the Y-coordinates of the one or more key points;
    computing a function of the delta values of the one or more key points in the sequence of proper poses; and
    counting a given user movement as a repetitive motion of a fitness activity based on the function of the delta values; and
    computing a plurality of statistics about the fitness activity based on the counting.

2. The computer-implemented method of claim 1, wherein the fitness activity is selected from the group consisting of running, jogging, walking, jumping, performing jumping jacks, squatting, and dribbling, and wherein the one or more repetitive motions are selected from the group consisting of steps, jumps, squats, and dribbles.

3. The computer-implemented method of claim 1, wherein the selecting the proper pose comprises:
selecting a most centered pose as the proper pose, when the hardware processor has detected multiple poses in a given frame.

4. The computer-implemented method of claim 1, wherein the selecting the proper pose comprises:
selecting the proper pose utilizing a human tracking algorithm, when the hardware processor has detected multiple poses in a given frame.

5. The computer-implemented method of claim 1, further comprising:
presenting one or more gamification elements based on the plurality of statistics.

6. The computer-implemented method of claim 1, wherein the input video is captured using the camera selected from the group consisting of a mobile device camera and a portable camera device.

7. The computer-implemented method of claim 1, wherein the one or more key points are selected from the group consisting of a body joints, a nose, an eyes, an ears, a chest, and a shoulders of the main user.

8. The computer-implemented method of claim 1, wherein the function of the delta values is selected from the group consisting of a mean, a median, and a single delta value selection.

9. The computer-implemented method of claim 1, wherein the function of the delta values is a mean delta value, and wherein the method further comprises:
counting the given user movement as the repetitive motion when the mean delta value changes from positive, to negative, to positive.

10. The computer-implemented method of claim 1, further comprising:
applying a smoothing function on the Y-coordinates of the one or more key points before computing the delta values.

11. The computer-implemented method of claim 1, further comprising:
performing a checking process on the given user movement's metrics to invalidate the given user movement based on one or more criteria.

12. The computer-implemented method of claim 11, further comprising
excluding the given user movement when its rising period is more than a given threshold; and
excluding the given user movement when its rising amplitude is smaller than a given threshold.

13. The computer-implemented method of claim 11, further comprising:
adjusting the checking process dynamically based on a detection sensitivity parameter.

14. The computer-implemented method of claim 11, further comprising:
utilizing a limb movement to control the checking process, wherein the limb movement is selected from the group consisting of a hand swing and a leg movement.

15. A non-transitory storage medium storing program code for implementing a single-user virtual fitness application, the program code executable by a hardware processor, the program code when executed by the hardware processor causes the hardware processor to:
receive an input video of one or more persons from a camera;
detect a sequence of human poses in the input video using a pose estimation process, wherein the pose estimation process is based on a Convolutional Neural Network (CNN);
select a proper pose for a main user of the virtual fitness application, when the hardware processor has detected multiple poses in a given frame of the input video, to generate a sequence of proper poses;
detect one or more key points in the sequence of proper poses, the one or more key points having Y-coordinates;
compute one or more delta values ($y_t - y_{t-1}$) corresponding to changes in the Y-coordinates of the one or more key points;
compute a function of the delta values of the one or more key points in the sequence of proper poses; and
count a given user movement as a repetitive motion of a fitness activity based on the function of the delta values; and
compute a plurality of statistics about the fitness activity based on the counting.

16. The non-transitory storage medium of claim 15, wherein the fitness activity is selected from the group consisting of running, jogging, walking, jumping, performing jumping jacks, squatting, and dribbling, and wherein the one or more repetitive motions are selected from the group consisting of steps, jumps, squats, and dribbles.

* * * * *